United States Patent [19]
Fujisawa

[11] Patent Number: 5,822,297
[45] Date of Patent: Oct. 13, 1998

[54] DISC CARTRIDGE WITH LOCKING SHUTTER HAVING AN INSERTING PORTION

[75] Inventor: Hirotoshi Fujisawa, Tokyo, Japan

[73] Assignee: Sony Corporation, Tokyo, Japan

[21] Appl. No.: 821,781

[22] Filed: Mar. 20, 1997

Related U.S. Application Data

[63] Continuation of Ser. No. 247,620, May 23, 1994, abandoned, which is a continuation of Ser. No. 844,104, Mar. 2, 1992, abandoned.

[30] Foreign Application Priority Data

Mar. 5, 1991  [JP]  Japan  .................................... 3-062477
Mar. 22, 1991  [JP]  Japan  .................................... 3-083386

[51] Int. Cl.⁶ .................................................. G11B 23/03
[52] U.S. Cl. ........................................... 369/291; 360/133
[58] Field of Search ............................. 360/133; 369/291

[56] References Cited

U.S. PATENT DOCUMENTS

| | | | |
|---|---|---|---|
| 4,614,990 | 9/1986 | Saito | 360/133 |
| 4,698,714 | 10/1987 | Sugawara et al. | 360/133 |
| 4,797,770 | 1/1989 | Takahasi | 360/133 |
| 4,858,050 | 8/1989 | Ashe et al. | 360/133 |
| 4,908,726 | 3/1990 | Kato | 360/133 |
| 5,014,151 | 5/1991 | Uehara et al. | 360/133 |
| 5,045,959 | 9/1991 | Ishimatsu | 360/133 |
| 5,051,857 | 9/1991 | Akiyama | 360/133 |
| 5,084,862 | 1/1992 | Fujita et al. | 369/291 |
| 5,226,035 | 7/1993 | Kato et al. | 360/133 |
| 5,262,918 | 11/1993 | Tannert | 360/133 |

FOREIGN PATENT DOCUMENTS

| | | |
|---|---|---|
| 0 266 794 A2 | 5/1988 | European Pat. Off. . |
| 0 393 858 A1 | 10/1990 | European Pat. Off. ........ G11B 23/03 |
| 0 402 037 A2 | 12/1990 | European Pat. Off. . |
| 0 421 775 A2 | 4/1991 | European Pat. Off. ........ G11B 23/03 |
| 0 472 443 A1 | 2/1992 | European Pat. Off. ........ G11B 23/03 |

*Primary Examiner*—Stuart S. Levy
*Assistant Examiner*—David D. Davis
*Attorney, Agent, or Firm*—Limbach & Limbach LLP

[57] ABSTRACT

A disc cartridge includes a shutter member movably supported by a cartridge main body accommodating a disc and provided with an aperture for laying a part of the major surface to outside across the inner periphery and the outer periphery of the disc. The disc cartridge further includes a holding member having its proximal side rotatably supported within the cartridge main body and adapted for holding the shutter member in a position of closing the aperture. The shutter member includes a plate portion for opening and closing the aperture of the cartridge main body, a mating engaging portion engaged by a part of the free end of the holding member, an inserting portion adapted for being inserted into a shutter opening groove provided in a lateral side of the cartridge main body and a connecting portion for connecting the plate portion and the inserting portion to each other. The shutter section, the mating engaging part, the inserting portion and the connecting portion are formed integrally from a metal material or a synthetic material. When the shutter member is moved to a position closing the aperture in the cartridge main body, the mating engaging portion of the shutter member is engaged with and maintained by the free end of the holding member for maintaining the aperture in the closed state.

6 Claims, 18 Drawing Sheets

DISC CARTRIDGE WITH LOCKING SHUTTER HAVING AN INSERTING PORTION

This is a continuation of application No. 08/247,620 filed on May 23, 1994, now abandoned, which is a continuation of application 07/844,104 filed on Mar. 2, 1992, now abandoned.

BACKGROUND OF THE INVENTION

1. Field of the Invention

This invention relates to a disc cartridge having accommodated therein a disc used as a recording medium for information signals, such as an optical disc or a magneto-optical disc. More particularly, it related to a disc cartridge comprised of a cartridge main body having accommodated therein a disc and provided with an aperture for laying a part of the disc to outside across its inner and outer peripheries and a shutter member movably mounted thereon for opening and closing said aperture.

2. Description of the Related Art

As a recording medium for information signals, a disc such as a magnetic disc, an optical disc or a magneto-optical disc, has been proposed. This disc has a disk-shaped substrate having its one major surface coated with a signal recording layer. The inner periphery of the disc, provided with a centering hole, is designed as a chucking region to be chucked by a disc rotating unit of a disc recording and/or reproducing apparatus. A region of the disc extending from the outer edge of the chucking region to the outer periphery is designed as a signal recording region.

For preventing deposition of dust and dirt or pollution by contact with hands or fingers, and for achieving handling ease, the disc is housed in a square-shaped casing-like cartridge main body so as to be constructed as a disc cartridge.

With such a disc cartridge, the disc housed within the cartridge main body is rotatable within the cartridge main body. A chucking aperture for exposing the chucking portion of the disc to the outside is provided in one of the major surfaces of the disc cartridge. A recording/reproducing aperture for laying at least a part of the major surface of the disc to the outside across its inner and outer peripheries is also provided in one of the major surfaces of the disc cartridge. Information signals may be written on or reproduced from the signal recording layer of the disc accommodated in the cartridge main body via the recording/reproducing aperture whilst the disc has its chucking portion chucked by the disc rotating unit via the chucking aperture on loading the disc cartridge in position within the disc recording and/or reproducing apparatus.

With the disc cartridge, for preventing intrusion of dust and dirt into the cartridge main body for protecting the disc, the recording/reproducing aperture is closed by the shutter member when the disc cartridge is out of use. The shutter member has a plate portion of a size to close the recording/reproducing aperture. The shutter member may be moved along a lateral side of the cartridge main body by having a proximal part of the plate portion supported by the lateral side of the cartridge main body. The shutter member is adapted for closing the recording/reproducing aperture with the plate portion.

With such a disc cartridge, the shutter member may be formed by bending a metallic plate, or by molding from a synthetic resin.

However, if it is attempted to produce the shutter member of the same shape as the shutter member formed by bending the metallic plate by molding of a synthetic resin, not only is molding rendered difficult, but the shutter member having sufficient mechanical strength cannot be produced. On the other hand, if the disc cartridge is constructed with the shutter member having a shape suitable for integral molding from the synthetic resin, the disc cartridge cannot be employed in a disc recording and/or reproducing apparatus intended to be used with the disc cartridge having the shutter member formed of the metallic plate. In other words, the opening/closing operation of the shutter member produced in conformity to respective properties of the different materials cannot be performed smoothly in a shutter mechanism of the disc recording and/or reproducing apparatus.

On the other hand, the shutter member having a suitable shape to be molded from the synthetic resin can be produced only with extreme difficultly by bending the metallic plate.

Objects and Summary of the Invention

It is an object of the present invention to provide a disc cartridge in which, when the shutter member is formed by bending a metallic plate, and the shutter member has a shape suited to integral molding from a synthetic resin, the shutter member may still be used in a disc recording and/or reproducing apparatus adapted for being used with a disc cartridge associated with a shutter member made from the metallic plate.

It is another object of the present invention to provide a disc cartridge in which, when the shutter member is formed by integrally molding a synthetic resin, and the shutter member is changed to a shape suited to bending from a one-piece metal plate or sheet, the shutter member may still be used in a disc recording and/or reproducing apparatus adapted for being used with a disc cartridge associated with a shutter member made from the synthetic resin.

A disc cartridge according to the present invention comprises a cartridge main body accommodating a disc and having an aperture in at least one major surface thereof for laying a portion of a major surface of the disc to the outside across an inner periphery and an outer periphery of the disc. The disc cartridge further includes a shutter member movably supported by the cartridge main body for opening or closing the aperture. The disc cartridge further included a holding member having its proximal end supported within the cartridge main body for rotation about the proximal end, the holding member being adapted for holding the shutter member in a position of closing the aperture. The shutter member includes a plate section for opening or closing the aperture, a mating engaging section engaged with a free end of said holding member, an inserting section adapted for being inserted into a shutter opening groove provided in a lateral side of the cartridge main body, and a connecting section for connecting the plate section to the inserting section. The plate section, mating engaging section, inserting section and the connecting section are formed integrally from a metallic material or a synthetic resin.

When the shutter member is moved to a position closing the aperture in the cartridge main body, the mating engaging part of the shutter member is engaged with and maintained by the free end of the holding member for maintaining the aperture in the closed position. When the disc cartridge is loaded in position in the disc recording and/or reproducing apparatus, the shutter opening member provided in the disc recording and/or reproducing apparatus is intruded into the shutter opening groove of the cartridge main body for rotating the holding member for disengaging the mating engaging section of the shutter member from the holding member and simultaneously moving the shutter member in a direction of opening the shutter member.

Other objects and advantages of the present invention will become more apparent from the following description.

DETAILED DESCRIPTION OF THE PREFERRED EMBODIMENTS

Figure 1:
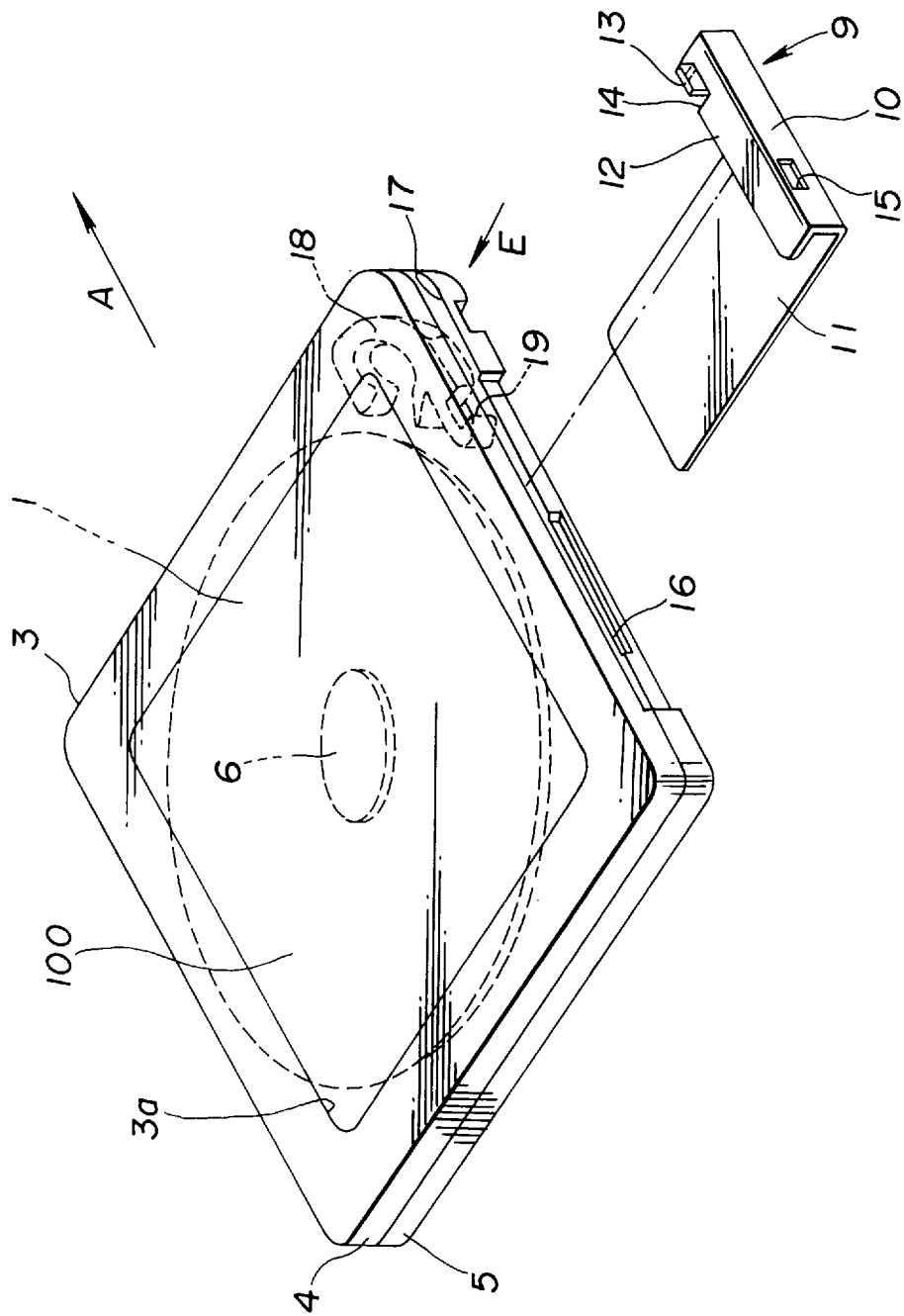
FIG. 1 is a perspective view showing a disc cartridge having accommodated therein a read-only disc and provided with a shutter member of a metallic material, and showing the state in which the shutter member is detached from the cartridge main body.

Referring to the drawings, certain preferred embodiments of the present invention will be explained in detail.

In a first embodiment, described hereinbelow, the present invention is applied to a disc cartridge in which a read-only disc is accommodated in a cartridge main body.

Referring to FIGS. 1 to 5, the disc cartridge is constituted by a cartridge main body 3, accommodating a read-only disc 1, and a shutter member 9 as later described. The read-only disc 1 include a disc substrate of a light-transmitting synthetic resin having its major surface irradiated by a light beam as a signal reading surface. Information signals are recorded as pits on the opposite major surface of the disc substrate and a signal recording layer of a metal material, such as aluminum, is applied on the pits. With the read-only disc, the information signals may be read by irradiating the signal recording layer with a light beam from the signal reading surface through the disc substrate. The read-only disc 1 has a diameter of an order of 64 mm. A center hole 7 and a disc hub 6, by means of which a disc reproducing apparatus adapted for reading the information signals from the signal reading surface is adapted for holding the read-only disc 1, are provided at a central portion of the disc 1. A signal recording region is provided for extending from the outer perimeter of the center hole 7 on the major surface as far as the outer rim of the disc substrate of the read-only disc 1. Meanwhile, read-only disc as used herein means not only a disc on which the information signals are recorded in the form of pits, but also to any recordable disc and a disc on which information signals are pre-recorded and can not be re-recorded.

The center hole 7 is a circular through-hole extending from one to the opposite major surfaces of the disc substrate and has its center coincident with the center of curvature of the recording track(s) formed spirally or concentrically in the signal recording region. The disc hub 6 is in the form of a disk of a diameter slightly larger than the center hole 7. This disc hub 6 is attached to the other major surface of the disc substrate of the read-only disc 1 for closing the center hole 7 so that the center of the center hole 7 is coincident with the center of the disc hub 6.

The cartridge main body 3 is constituted as a thin rectangular casing for housing the read-only disc 1 therein by abutting and securing an upper half 4 and a lower half 5 to each other. The cartridge main body 3 is substantially in the form of a square in which each side of upper and lower major surfaces adjacent to the major surfaces of the disc 1 is approximately 68 to 72 mm long which is slightly longer than the disc diameter. The read-only disc 1 is housed within the cartridge main body 3 with the signal reading major surface and the opposite major surface thereof facing the lower half 5 and the upper half 4, respectively.

The lower major surface of the cartridge main body 3 is provided with an aperture 22 for an optical pickup device. The aperture 22 for the optical pickup device is a substantially rectangular through-hole extending from near the center of the lower major surface of the main cartridge body 3 to close to a side of the lower major surface, that is close to a lateral side of the cartridge main body 3. The aperture 22 for the optical pickup device is adapted for exposing to the outside a part of the signal recording region of the read-only disc 1 directed to the lower half 5 across the inner and outer peripheries of the disc. Information signals are read from the read-only disc 1 by the optical pickup device of the disc reproducing apparatus via the aperture 22 for the optical pickup device.

A substantially circular chucking aperture 8 is provided at the center of the major surface of the lower half 5. This chucking aperture 8 exposes to the outside a part of the disc hub 6 and the center hole 7. The read-only disc 1 is held by a disc table, not shown, of the disc reproducing apparatus, which is intruded via the chucking aperture into the cartridge main body 3.

The shutter member 9 is mounted on the cartridge main body 3, as shown in FIGS. 1 to 5. The shutter member 9 is adapted for closing the aperture 22 for the optical pickup device. The shutter member 9, having a predetermined uniform thickness of e.g. 0.3 mm, is constituted by a connecting web 10, a plate portion 11 and an inserting portion 12 which are extended substantially orthogonally with respect to and supported by the connecting web 10. The shutter member 9 is formed as one piece from a metallic material, such as stainless steel.

The plate portion 11 is in the form of a rectangle slightly larger in size than the aperture 22, that is, it has a longitudinal length of the order of 25 to 30 mm, for so that it is capable of occasionally closing the aperture 22. The connecting web 10 has a length longer than the width of the plate portion 11. The inserting portion 12 is supported by the lateral side of the plate portion 11 for extending parallel to the plate portion 11. The inserting portion 12 has a length along the length of the plate portion 11 shorter than the longitudinal length of the plate portion 11 and is of the order of 4 mm. The inserting portion 12 has a length along the width of the plate portion 11 approximately equal to the longitudinal length of the connecting web 10.

The inserting portion 12 is formed with an upright substantially rectangular shutter opening lug 13. The lug 13 has a height above the inserting portion 12 of 1 to 2 mm and a width of the order of 4 mm. The inserting portion 12 also has a notch 14 extending from the free end of the inserting portion 12 towards the connecting web 10. The notch 14 may be formed laterally of the lug by segmenting the lug 13 from the inserting portion 12.

The lateral side of the plate portion 11, supported by the connecting web 10, is formed with engaging pawls 25, 25 and engaging projections 24, 24 adapted for being engaged with a supporting groove 23 formed in the vicinity of the lateral side of the lower major surface of the cartridge main body 3. These pawls 25, 25 are formed by segmenting a part of the plate portion 11, whilst the engaging projections 24, 24 are formed by bending a part of the plate portion 11. The supporting groove 23 is provided in the vicinity of and along the lateral side of the lower major surface of the cartridge main body 3.

The lateral side of the cartridge main body 3 is provided with a shutter opening groove 17. The shutter opening groove 17 is formed in one lateral side of the cartridge main body 3 parallel to the direction of insertion of the disc cartridge into the disc reproducing apparatus and is of a width corresponding to the height of the shutter opening lug 13. The shutter opening groove 17 is extended along the disc cartridge inserting direction and is opened at the forward side in the inserting direction. The shutter member 9 is supported by engaging the distal ends of pawls 25, 25 in the supporting groove 23 and by introducing the inserting portion 12 into the shutter opening groove 17, so that the connecting web 10 is in contact with the lateral side of the cartridge main body 3.

With the engaging pawls 25, 25 and the engaging projections 24, 24 being slidable along the supporting groove 23, the shutter member 9 may be moved along the lateral side of the cartridge main body 3. The shutter member 9 is also supported so that the plate portion 11 is in contact with the lower major surface of the cartridge main body 3. The shutter member 9 may be moved relative to the cartridge main body 3 with the plate portion 11 in contact with the lower major surface of the cartridge main body 3. By displacing the shutter member 9 relative to the cartridge main body 3, the plate portion 11 may be moved between a position of closing the aperture for the optical pickup device 22 as shown in FIG. 3 and a position of opening the aperture for the optical pickup device 22.

Figure 3:
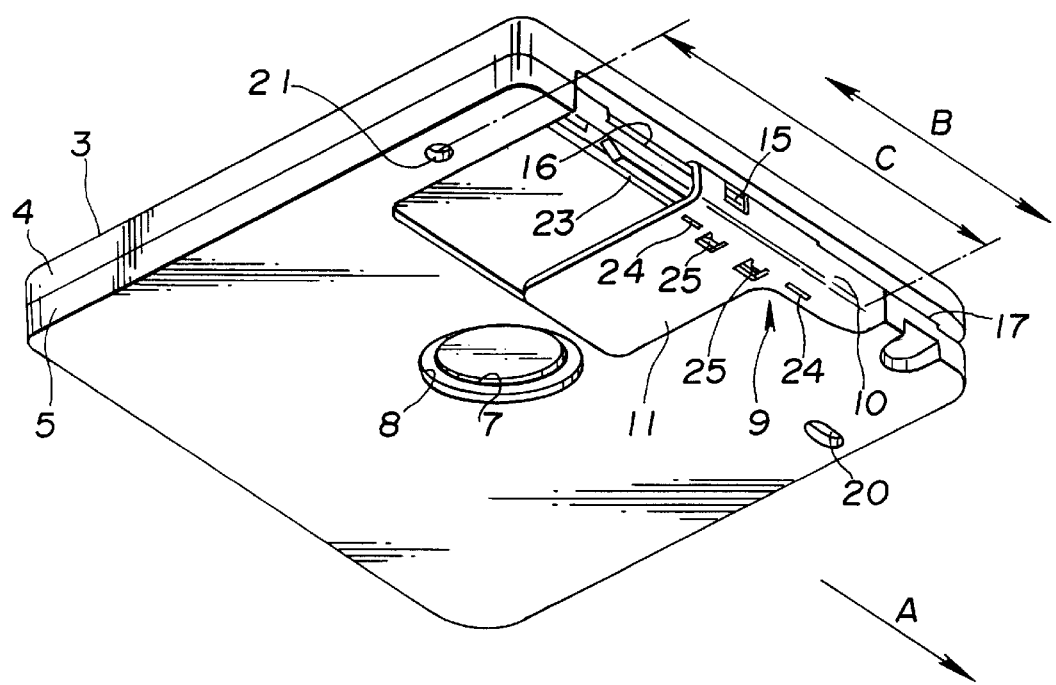
FIG. 3 is a perspective view showing the disc cartridge of FIG. 1 as viewed from the lower side.
Figure 4:
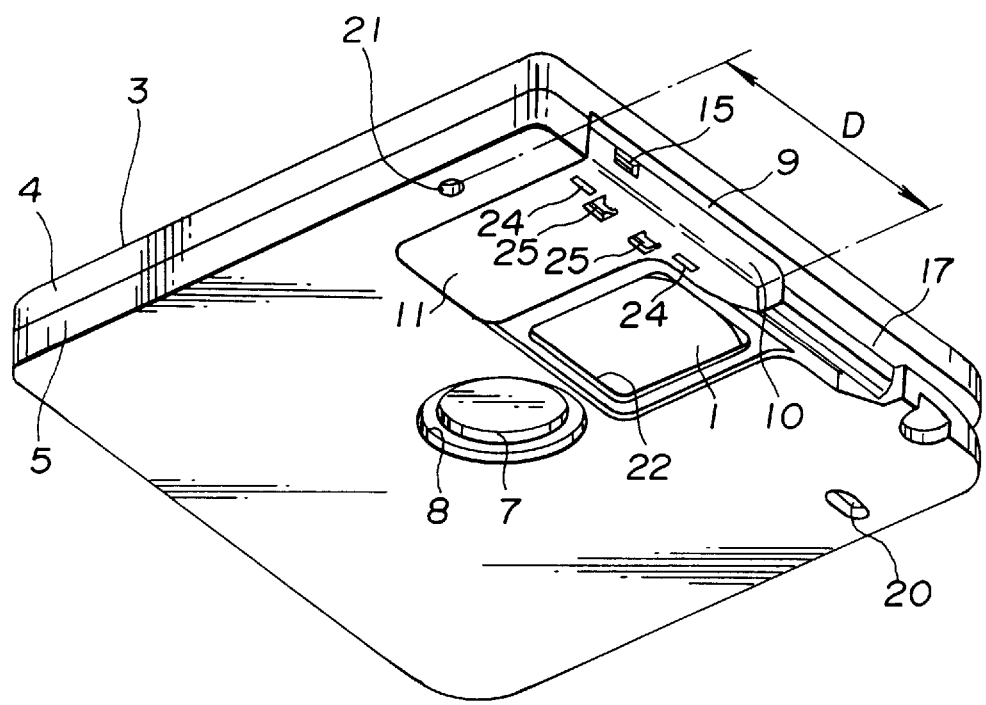
FIG. 4 is a perspective view showing the disc cartridge of FIG. 1, as viewed from the lower side, and showing the state in which the shutter member of the disc cartridge of FIG. 1 has closed an aperture of the cartridge main body.
Figure 5:
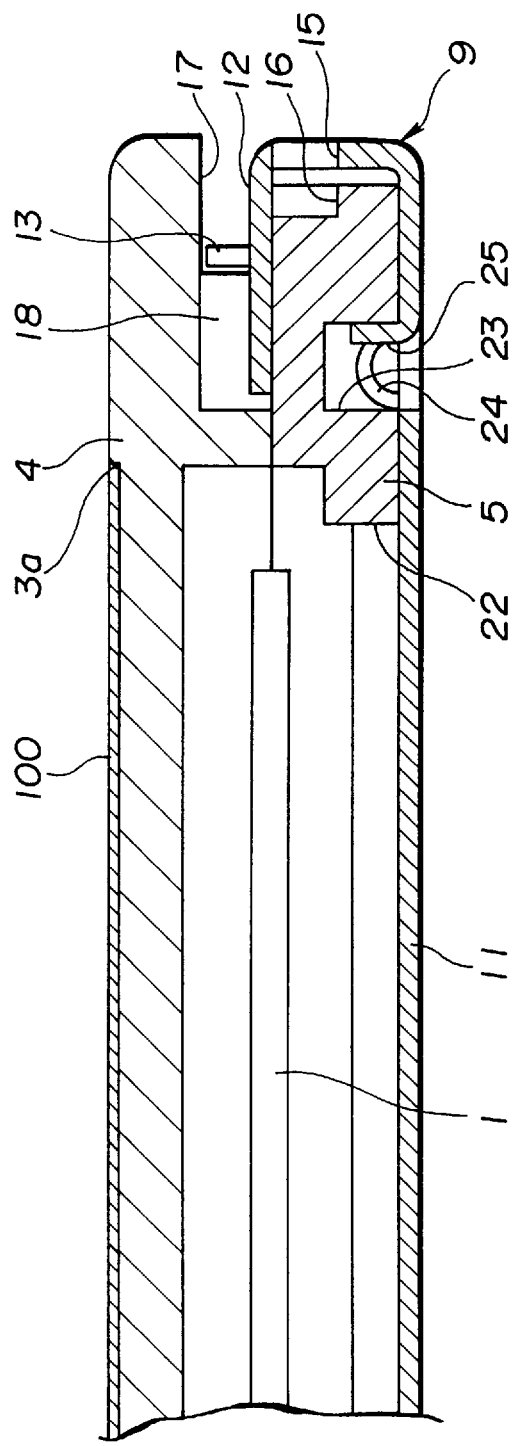
FIG. 5 is a cross-sectional view taken along line a–a' in FIG. 2, with a portion thereof being broken away.
Figure 6:
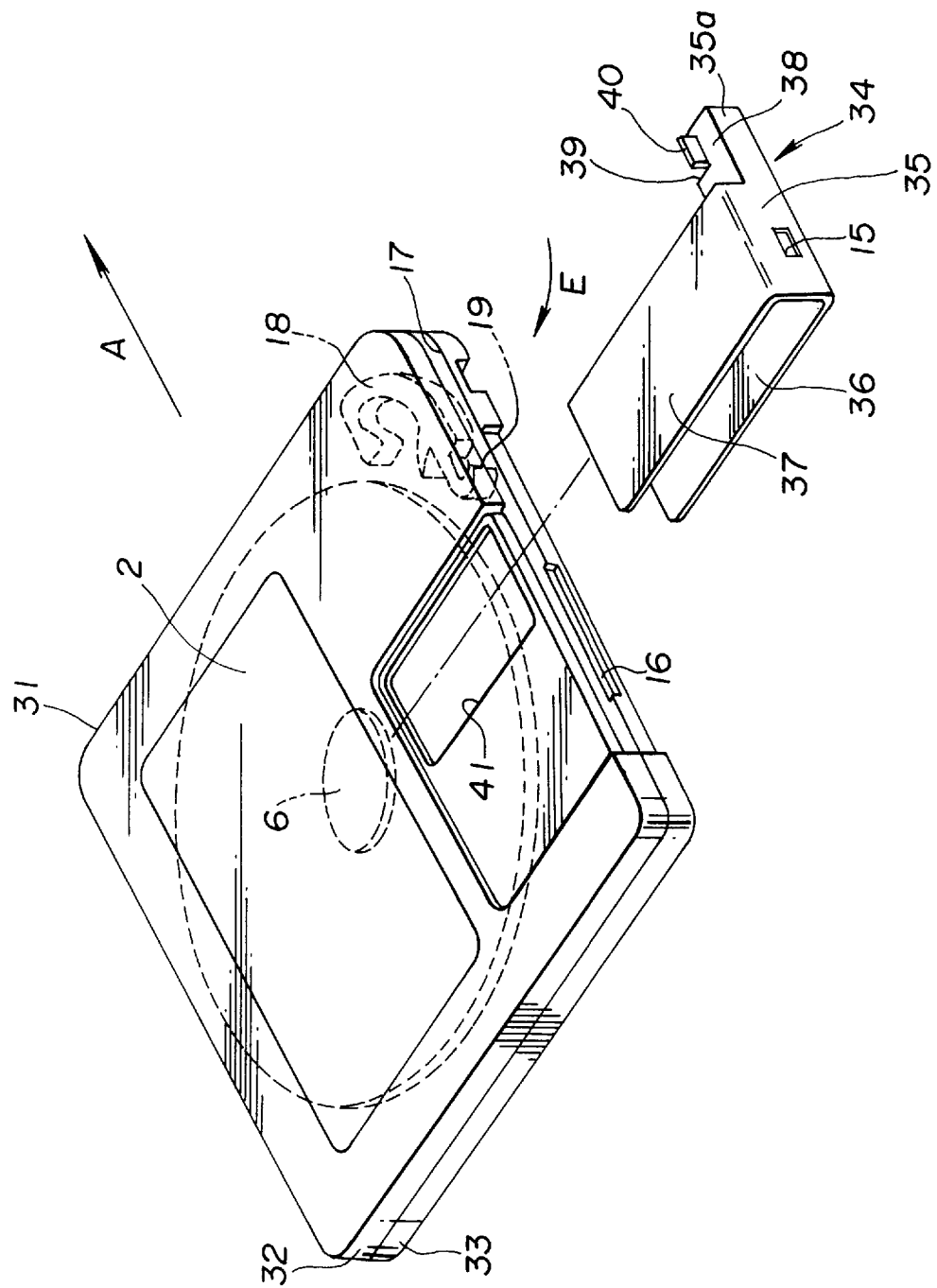
FIG. 6 is a perspective view showing a disc cartridge having accommodated therein a disc adapted for recording and/or reproducing information signals and fitted with a shutter member of a metallic material, with the shutter member detached from the cartridge main body.
Figure 7:
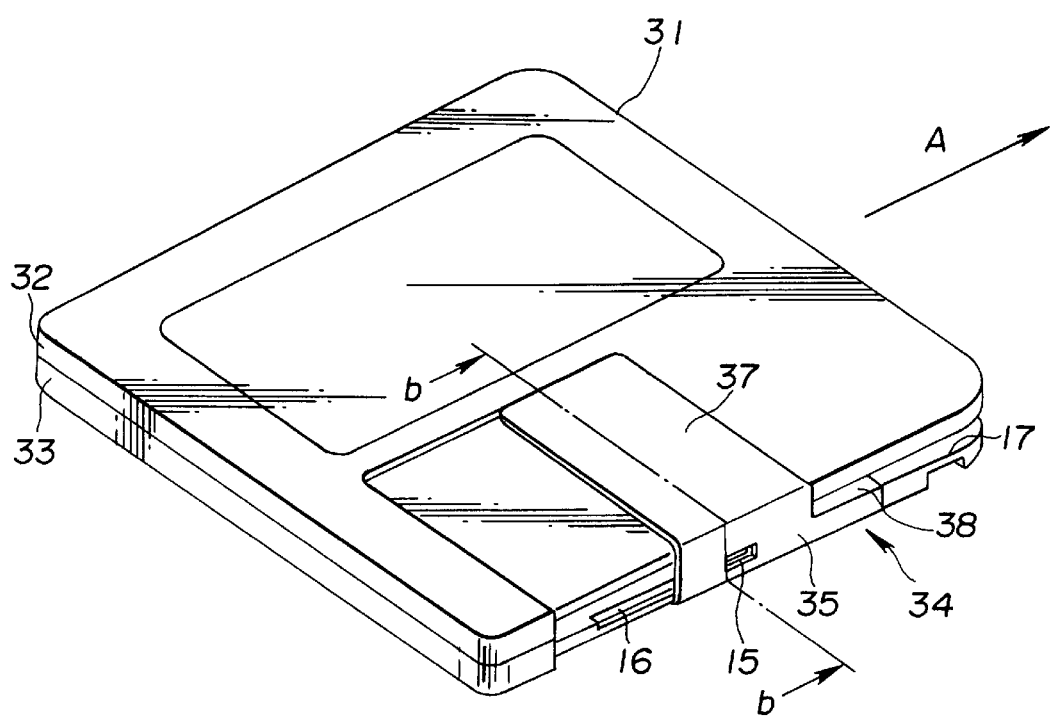
FIG. 7 is a perspective view showing the disc cartridge of FIG. 6 from the upper side.

Within the cartridge main body 3, there is provided a locking member 18 for locking the shutter member 9 at the position of closing the aperture for the optical pickup device 22 by the plate portion 11 as shown in FIG. 3. The locking member 18 is formed of a flexible resilient material in the form of an arm having its one end secured in position within the cartridge main body 3 and having its other free end intruded into the shutter opening groove 17. A locking section 19 is formed at the other end of the locking member 18 for extending outwardly of the cartridge main body 3.

The locking section 19 of the locking member 18 is adapted for being engaged in the notch 14 of the shutter member 9 when the plate portion 11 of the shutter member 9 is in the position of closing the aperture for the optical pickup device 22. That is, the locking member 18 locks the shutter member 9 in the position of closing the aperture for the optical pickup device 22. The locking member 18 is thrust via the shutter opening groove 17 by a thrusting pin, not shown, of the disc reproducing apparatus and thereby deformed elastically towards the interior of the cartridge main body 3, as shown by an arrow E in FIG. 1, for disengaging the shutter member 9.

A shutter closing through-hole 15 is formed in the connecting web 10. When the shutter member 9 is closed by the disc reproducing apparatus, an engaging pin, not shown, is intruded into the shutter closing through-hole 15 for displacing the shutter member 9 in the closing direction relative to the cartridge main body 3. In the lateral wall of the cartridge main body 3, formed with the shutter opening groove 17, a closing pin escape groove 16 is formed for extending along the shutter opening groove 17. The function of the closing pin escape groove 16 is to prevent the engaging pin of the disc reproducing apparatus from being abutted against the lateral side of the cartridge main body 3 when the engaging pin is introduced into the shutter closing through-hole 15.

Figure 2:
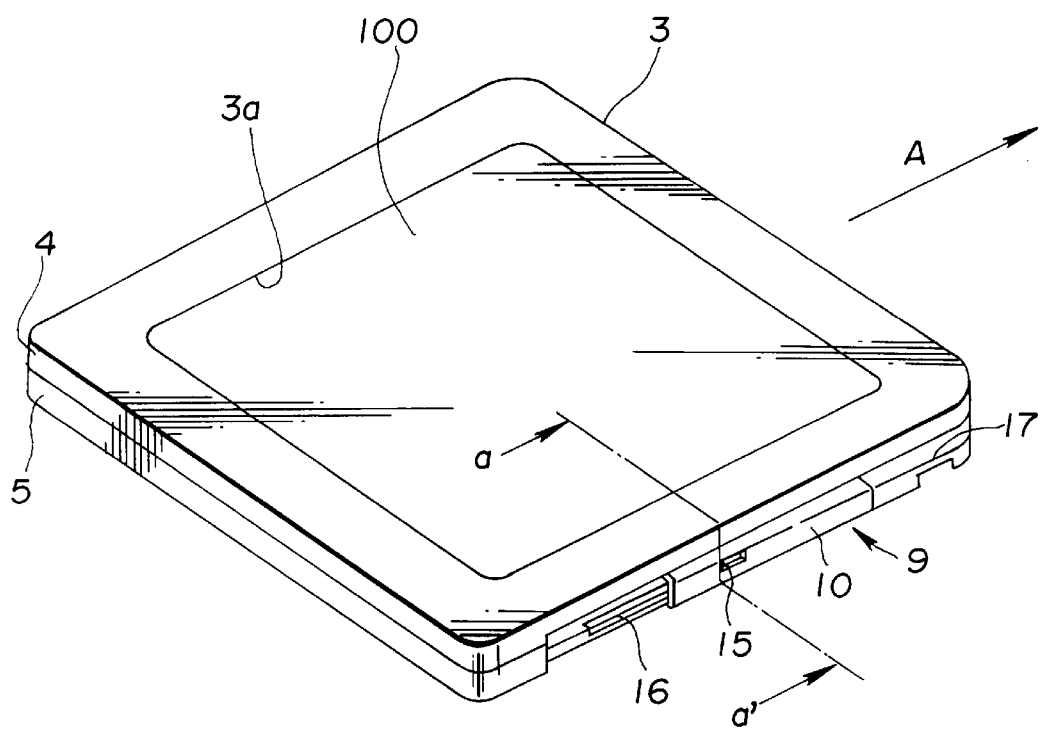
FIG. 2 is a perspective view showing the disc cartridge of FIG. 1 as viewed from the upper side.

With the above described disc cartridge of the present invention, the aperture for the optical pickup device 22 device is closed by the plate portion 11 of the shutter member, as shown in FIGS. 2 and 3, when the disc cartridge is not in use. This prevents dust and dirt or the finger from being intruded into the cartridge main body 3 via the aperture for the optical pickup device 22.

When the disc cartridge is in use, the disc cartridge is loaded in position in a cartridge loading section within the disc reproducing apparatus. The cartridge main body 3 is loaded in position in the cartridge loading section by a plurality of positioning pins provided on the chassis being introduced into first and second positioning holes 21, 20 provided in the lower major surface of the cartridge main body 3. Also, by the thrust pin (or any other shutter opening member) of the disc reproducing apparatus being intruded into the shutter opening groove 17, the locking member 18 is resiliently deformed so as to be rotated towards the inner space of the cartridge main body 3 for disengaging the locking member 18 from the shutter member 9. Also, with the present disc cartridge, the shutter opening lug 13 is thrust by the thrust pin for displacing the shutter member 9 from the closing position shown in FIG. 3 towards the opening position shown in FIG. 4 for opening the aperture 22 for the optical pickup device 22. At this time, the information signals may be read from the read-only disc 1 via the aperture 22 for the optical pickup device.

Meanwhile, with the present disc cartridge, when the aperture 22 for the optical pickup device is closed by the plate portion 11 of the shutter member 9, the distance between the shutter opening lug 13 and the first positioning hole 21 is a first distance X as indicated by an arrow C in FIG. 3. Also, with the present disc cartridge, when the aperture 22 for the optical pickup device is opened by the plate portion 11 of the shutter member 9, the distance between the shutter opening lug 13 and the first positioning hole 21 is a second distance Y as indicated by an arrow D in FIG. 4.

With the present disc cartridge, since the shutter member 9 is slid by the thrust pin intruded into the shutter opening groove 17, the shutter member 9, when modified into a shape suited to be molded integrally from a synthetic resin material, may be used in a disc reproducing apparatus adapted to be used in conjunction with a disc cartridge having the shutter member 9 formed of a metallic material.

The read-only disc 1 is set on the disc table of the disc reproducing apparatus. The disc table is rotatable and smaller in diameter than the chucking aperture 8 and larger in diameter than the center hole 7. When the cartridge main body 3 is loaded in the cartridge loading section of the disc reproducing apparatus, the disc table is introduced into the cartridge main body 3 via the chucking aperture 8. When the disc table is intruded into the cartridge main body 3, the read-only disc 1 is held with the major surface region around the center hole 7 being set on the upper surface of the disc table.

Meanwhile, the disc table has a substantially conical centering projection on its major surface, this centering projection being inserted into the center hole 7 of the read-only disc 1 for centering the read-only disc 1. A permanent magnet, not shown, is enclosed in the centering projection for magnetically attracting a disc hub 6. The read-only disc 1 is positioned in a predetermined manner relative to the disc table by the upper surface of the disc table and the centering projection. The information signals are read from the read-only disc 1 by the optical pickup device of the disc reproducing apparatus.

Meanwhile, with the present disc cartridge, the shutter member 9 is not in contact with the upper major surface of the cartridge main body 3. Thus the upper major surface of the cartridge main body 3 in its entirety may be utilized for inscription, printing or affixture of a label 100 for indicating the contents of the information signals recorded on the read-only disc 1.

Meanwhile, the upper major surface of the cartridge main body 3 is recessed at 3a so that, on affixing the label 100, the upper surface of the label is flush with the upper major surface of the cartridge main body 3.

On the other hand, since it suffices for the present disc cartridge to be provided with only one plate section associated with the aperture 22 for the optical pickup device, the disc cartridge may be reduced in size so that the cartridge main body 3 itself may be reduced in size.

A modified embodiment of the present invention will be explained hereinbelow, in which the present invention is applied to a disc cartridge accommodating a recordable disc which may be used for recording and reproducing information signals.

Referring to FIGS. 6 to 10, the disc cartridge is constituted by a cartridge main body 31, accommodating a recordable disc 2, and a shutter member 31 as later described. The recordable disc 2 is a so-called magneto-optical disc having a disc substrate formed of a light-transmitting synthetic resin material. The disc substrate has one of its major surfaces formed as a signal recording surface and the other major surface provided with a signal recording layer formed by deposition of a magnetic material. Information signals may be recorded on the signal recording layer of the recordable disc 2 by irradiating the signal recording layer with a converged laser beam through the disc substrate and applying a magnetic field modulated in accordance with information signals recorded on the recordable disc 2 to the signal recording layer from the opposite major surface of the disc substrate. On the other hand, information signals may be read from the signal recording layer by irradiating the signal recording layer with a converged laser beam through the disc substrate from the signal recording surface. The recordable disc 2 has a diameter of the order of e.g. 64 mm.

A center hole 7 and a disc hub 6, by means of which a disc reproducing apparatus adapted for recording and/or reproducing the information signals on or from the signal recording layer is adapted for holding the recordable disc 2, are provided at a central portion of the disc 2, as in the case of the read-only disc 1. A signal recording region is provided for extending from the outer perimeter of the center hole 7 on the major surface as far as the outer rim of the disc substrate of the recordable disc 2.

The center hole 7 is a circular through-hole extending from one to the opposite major surfaces of the recordable disc 2 and has its center coincident with the center of curvature of the recording track(s) formed spirally or concentrically in the signal recording region. The disc hub 6 is in the form of a disk formed of a magnetic material, such as metal, and is of a diameter slightly larger than the center hole 7. This disc hub 6 is attached to the other major surface of the recordable disc 2 for closing the center hole 7 so that the center of the center hole 7 is coincident with the center of the disc hub 6.

The cartridge main body 31 is constituted as a thin rectangular casing for housing the recordable disc 2 therein by abutting and securing an upper half 4 and a lower half 5 to each other, similarly to the cartridge main body 3 of the preceding fist embodiment. The cartridge main body 31 is substantially in the form of a square in which each side of upper and lower major surfaces adjacent to the major surfaces of the disc 2 is approximately 68 to 72 mm long which is slightly longer than the disc diameter. The recordable disc 2 is housed within the cartridge main body 31 with the signal reading major surface and the opposite major surface thereof facing the lower half 5 and the upper half 4, respectively.

The lower major surface of the cartridge main body 31 is provided with an aperture 22 for an optical pickup device. The aperture 22 for the optical pickup device is a substantially rectangular through-hole extending from near the center of the lower major surface of the cartridge main body 31 to close to a side of the lower major surface, that is close to a lateral side of the cartridge main body 31. The aperture 22 for the optical pickup device is adapted for laying to outside a part of the signal recording region of the recordable disc 2 directed to the lower half 5 across the inner and outer peripheries of the disc. When information signals are recorded on or reproduced from the signal recording layer, a light beam is irradiated on the recordable disc 2 by an optical pickup device, not shown, of the disc recording and/or reproducing apparatus via the aperture 22.

The upper major surface of the cartridge main body 31 is formed with an aperture 41 for a magnetic head unit, not shown. The aperture 41 for the magnetic head unit is a substantially rectangular though-hole similar to the aperture 22 and is provided at a position facing the aperture 22 with the recordable disc 2 in-between. The aperture 41 for the magnetic head unit is adapted for exposing to the outside a part of the opposite major surface of the recordable disc 2 across its inner and outer peripheries. The external magnetic field is applied to the signal recording layer via the aperture for the magnetic head unit of the disc recording and/or reproducing apparatus when recording information signals on or from the signal recording layer.

A substantially circular chucking aperture 8 is provided at the center of the major surface of the lower half 5. This chucking aperture 8 exposing to the outside a part of the disc hub 6 and the center hole 7. The recordable disc 2 is held by a disc table, not shown, of the disc reproducing apparatus, which is intruded via the chucking aperture into the cartridge main body 31.

A shutter member 34 is mounted on the cartridge main body 31. The shutter member 34 is adapted for closing the apertures 22 and 41. Referring to FIGS. 6 to 10, the shutter member 34 is composed of a first plate portion 36, associated with the aperture for the optical pickup device 22, a second plate portion 37 associated with the aperture for the magnetic head unit 41 and a connecting portion 35 interconnecting the proximal ends of these plate portions 36, 37, and is formed by bending a one-piece metal plate.

The connecting portion 35 is formed as a rectangular plate having a width substantially corresponding to the thickness of the cartridge main body 3. In order to close the aperture 22, 41 the plate portions 36, 37 are formed as rectangular plates of a size slightly larger than these apertures and of a uniform thickness of an order of e.g. 0.3 mm. The plate portions 36, 37 face each other in parallel with a gap in-between substantially corresponding to the thickness of the cartridge main body 31.

The connecting portion 35 is extended in one longitudinal direction for providing an extension 35a. This extension 35a is formed as a rectangular plate having a width one-half the thickness of the connecting portion 35, and is extended in one direction from lateral sides of the plate portions 36, 37. The second plate portion 36 has its one end supported by the connecting portion 35 increased gradually in thickness towards a connecting region with the connecting portion 35 in view that the connecting portion 35 has the extension 35a.

The extension 35a has an inserting portion 38 which is perpendicular to the extension 35a and parallel to the plate portions 36, 37 so as to be extended towards the free lateral sides of the plate portions 36, 37 with a length shorter than these plate portions 36, 37. The inserting portion 38 is provided at a plane located halfway between the planes of the plate portions 36, 37. The inserting portion 38 is provided with a shutter opening lug 40 which is normal to the inserting portion 38 and parallel to the connecting portion 35 and which is extended towards the second plate portion 37. The lug 40 has a height from the inserting portion 38 of the order of 1 to 2 mm and a width of the order of e.g. 4 mm. The inserting portion 38 has a locking notch 39 extended from the free end of the inserting portion 38 towards the connecting portion 35. The notch 39 may be formed at the time of segmenting the lug 40.

Figure 8:
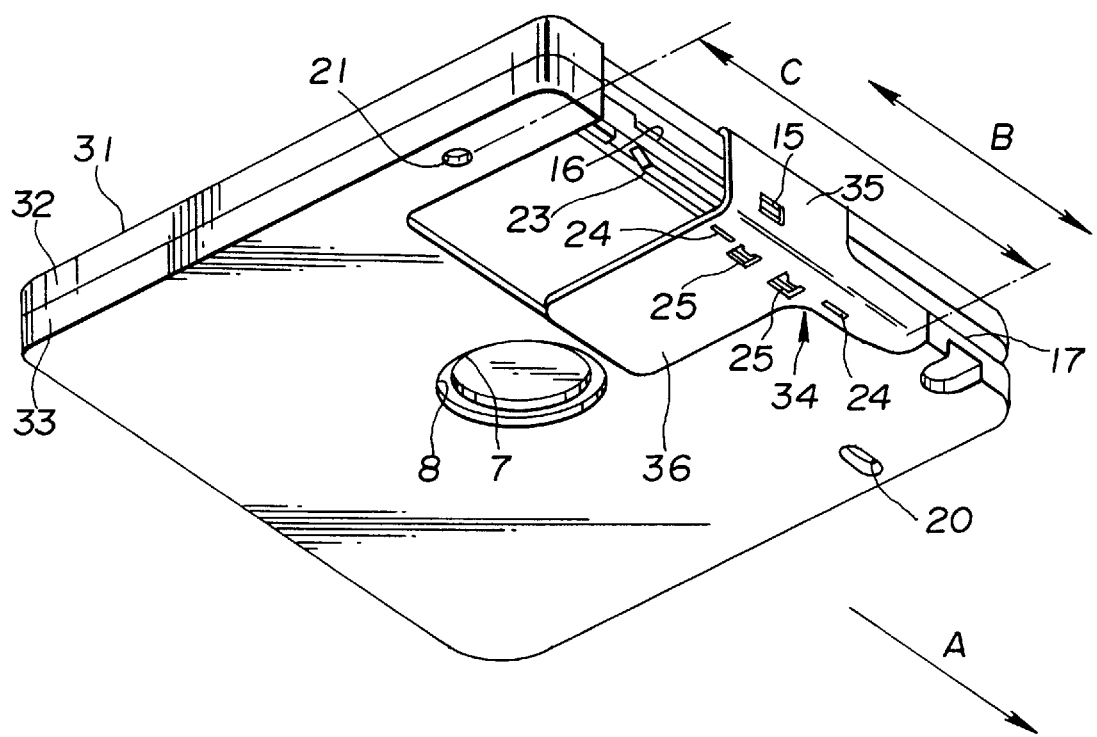
FIG. 8 is a perspective view showing the construction of the disc cartridge of FIG. 6 from the bottom side.
Figure 9:
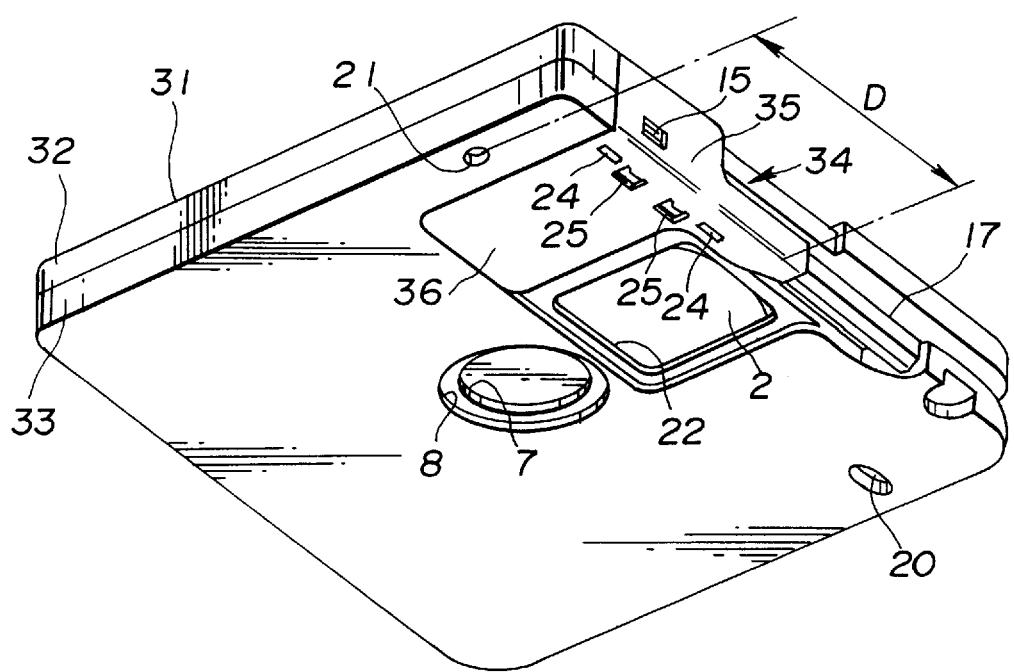
FIG. 9 is a perspective view showing the disc cartridge shown in FIG. 6 from the bottom side, with the shutter member in a position of closing the aperture in the cartridge main body.
Figure 10:
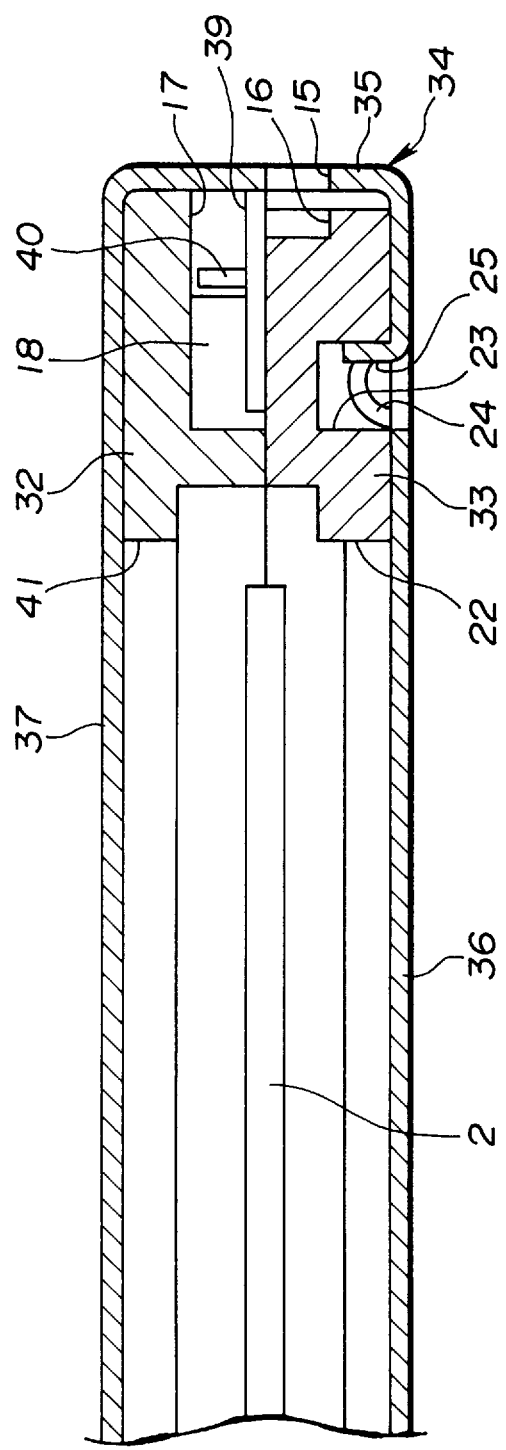
FIG. 10 is a cross-sectional view taken along line b—b in FIG. 7, with a portion being broken away.
Figure 11:
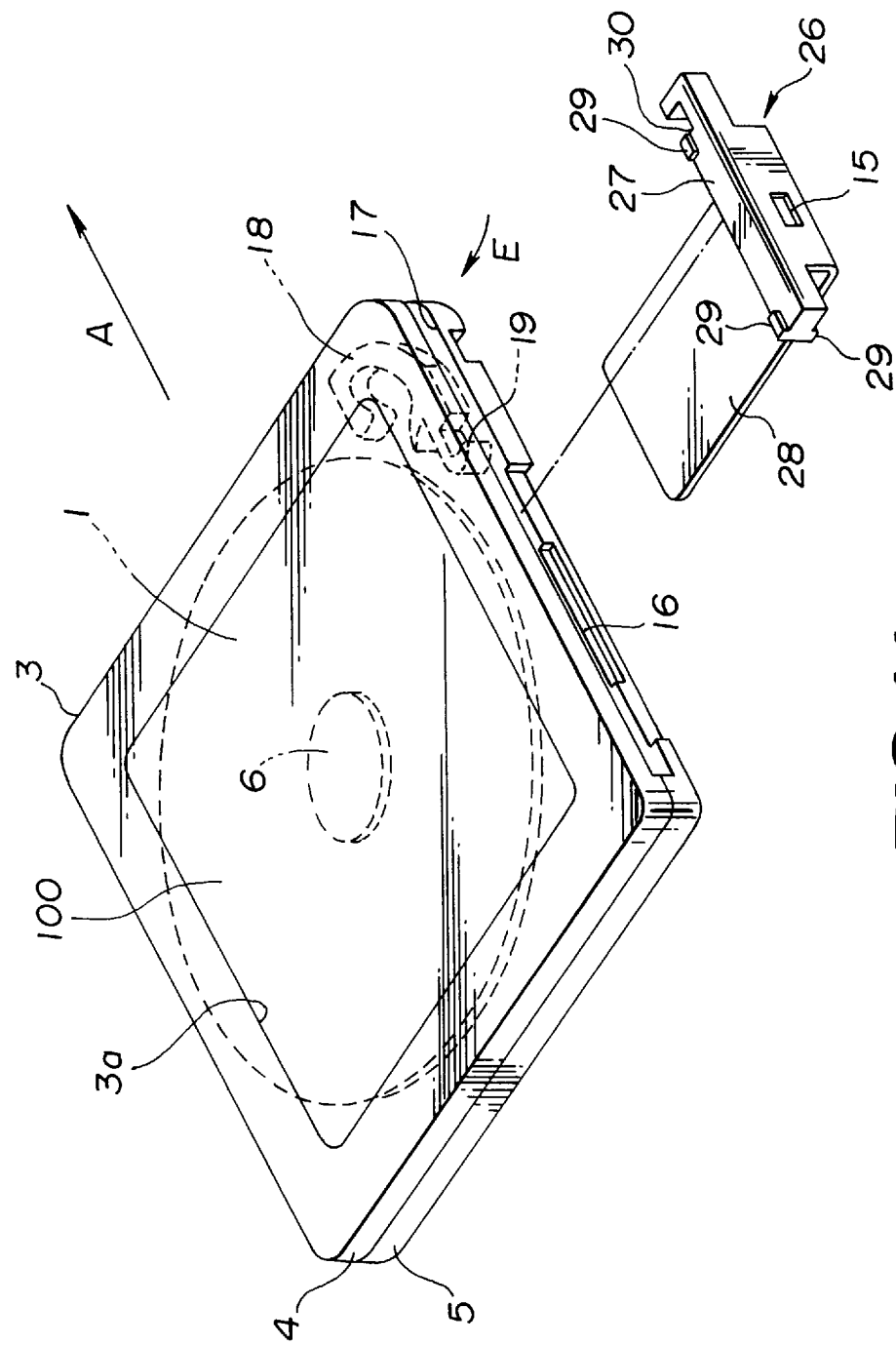
FIG. 11 is a perspective view showing a disc cartridge having accommodated therein a read-only disc and fitted with a shutter member of a metallic material, with the shutter member detached from the cartridge main body.

Referring to FIGS. 8 and 9, engaging pawls 25, 25 and engaging projections 24, 24, adapted for being engaged in a supporting grove 23 provided in the lower major surface of the cartridge main body 31, are formed towards the proximal side of the plate portion 36 which is increased in width. The supporting groove 23 is formed for extending along the lateral side of the lower half 33. The engaging pawls 25, 25 are formed by segmenting the first plate portion 36, while the engaging projections 24, 24 are formed by stamping a part of the first plate portion 36.

Referring to FIGS. 7 to 10, the shutter member 34 is supported by the cartridge main body 31 by engaging the engaging pawls 25, 25 and the engaging projections 24, 24 in the supporting groove 23 so that the connecting portion 35 is substantially abutted against the lateral side of the cartridge main body 31 and so that the first and second plate portions 36, 37 are extended along the lower and upper major surfaces of the cartridge main body 31. The inserting portion 38 is inserted at this time in a shutter opening groove 17 provided in a lateral side of the cartridge main body 31. The shutter opening groove 17 is provided along a lateral side wall of the cartridge main body 31 extending along the inserting direction of the disc cartridge into the disc recording and/or reproducing apparatus, and is of a width corresponding to the height of the shutter opening lug 40. The shutter opening groove 17 is formed along the front side of the cartridge main body 31 in the inserting direction of the disc cartridge and opened towards the front side in the inserting direction. When the shutter member 34 is attached to he cartridge main body 31, the shutter opening lug 40 is inserted into the shutter opening groove 17.

By the engaging pawls 25, 25 and the engaging projections 24, 24 being slidable along the supporting groove 23, the shutter member 34 may be moved along the sidewall of the cartridge main body 31 provided with the shutter opening groove 17, as shown by an arrow B in FIGS. 8. With the shutter member 34 being thus moved relative to the cartridge main body 31, the first plate portion 36 is moved between a position of closing the aperture 22 for the optical pickup device and a position of opening the aperture 22 for the optical pickup device. Similarly, by the shutter member 34 being moved relative to the cartridge main body 31, the first plate portion 37 is also moved between a position of closing the aperture 41 for the magnetic head unit and a position of opening the aperture 41 for the magnetic head unit. The shutter member 34 is moved parallel to the inserting direction of the disc cartridge into the disc recording and/or reproducing apparatus as shown by an arrow A in FIGS. 6 to 8. Meanwhile, the extension 35a is provided for being extended towards the apertures 22 and 41 when apertures 22 and 41 are opened by the plate portions 36 and 37.

A locking member 18, provided within the cartridge main body 31, is formed from e.g. a synthetic material having flexibility and resiliency and is formed as an arm having its proximal end secured within the cartridge main body 31 and having its free end located within the shutter opening groove 17. The free end of the locking member 18 located within the shutter opening groove 17 is provided with a retainer 19 extended towards the outer side of the cartridge main body 31. When the shutter member 34 is in the position of closing the apertures 22, 41, the retainer 19 is engaged in the notch 39 provided in the inserting portion 38 for locking the shutter member 34 in the aperture closing position.

The connecting portion 35 is formed with a shutter closing through-hole 15 into which a shutter closing pin, not shown, of the disc recording and/or reproducing apparatus is introduced for moving the shutter member 34 in a direction of the aperture closing position. An operating pin escape groove 16 is provided in register with the trajectory of the shutter closing through-hole 15 in the sidewall of the cartridge main body 31 provided with the shutter opening groove 17. The function of the escape groove 16 is to prevent the shutter closing pin introduced into the through-hole 15 from being abutted against the cartridge main body 31.

With the above described disc cartridge of the present invention, when the disc cartridge is not in use, the apertures 22, 41 are closed by the plate portions 36, 37 for preventing dust and dirt and fingers or the like from being intruded via these apertures 22, 41 into the cartridge main body 31.

When in use, the disc cartridge is loaded in position on a cartridge loading section provided on a chassis of the disc recording and/or reproducing apparatus. The cartridge main body 31 is loaded in position on the cartridge loading section on the chassis by the plural positioning pins on the chassis being introduced into the first and second positioning holes 21, 22 formed in the lower major surface of the cartridge main body 31. With the present disc cartridge, when a thrust pin, not shown, of the disc recording and/or reproducing apparatus, is intruded into the shutter opening groove 17, the locking member 18 is deformed resiliently towards the inner side of the cartridge main body 31 for releasing retention of the shutter member 34. Besides, the shutter opening lug 40 is thrust by the thrust pin for shifting the shutter member 34 from the aperture closing position shown in FIG. 8 to the aperture opening position shown in FIG. 9 for opening the apertures 22, 41. The recordable disc 2 is set and maintained on the disc table of the disc recording and/or reproducing apparatus by having a region around the center hole 7 of one of the major surfaces thereof being supported on the upper surface of the disc table. This enables information signals to be written or read on or from the disc 2 via apertures 22, 41.

Meanwhile, with the present disc cartridge, when the apertures 22, 41 are closed by the plate portion 36, 37 of the shutter member 34, the distance between the shutter opening lug 40 and the first positioning hole 21 is a first distance X as indicated by an arrow C in FIG. 8, as in the case of the disc cartridge accommodating the read-only disc. Also, with the present disc cartridge, when the apertures 22, 41 are opened by the shutter member 34, the distance between the shutter opening lug 40 and the first positioning hole 21 is a second distance Y as indicated by an arrow D in FIG. 9.

With the present disc cartridge, since the shutter member 34 is slid by the thrust pin intruded into the shutter opening groove 17, the shutter member 34, when modified into a shape suited to be molded integrally from a synthetic resin material, may be used in a disc recording and/or reproducing apparatus adapted to be used in conjunction with a disc cartridge having the shutter member 34 formed of a metallic material.

Furthermore, the disc accommodated in the disc cartridge may also be a magnetic disc, instead of a magneto-optical disc of the preceding embodiment.

With the above described second embodiment of the disc cartridge of the present invention, the connecting portion 35 of the shutter member 4, movably supported on a lateral side of the cartridge main body 31 accommodating the recordable disc 2, is provided with the extension 35a extended in the direction of movement of the shutter member 34, and the length of the extension 35a along the aforementioned lateral side of the cartridge main body 31 is longer than the length of the plate portions 36, 37 along the lateral side of the cartridge main body 31. The shutter member is supported by having the inserting portion 38 of the extension 35a introduced into the groove 17 formed in the lateral side of the cartridge main body 31.

The result is that, with the present disc cartridge, when the shutter member 34 is moved along the lateral side of the cartridge main body 31 under the effect of an operating pressure applied to the connecting portion 35, the shutter member 34 may be prevented from being tilted relative to the movement direction thereof relative to the cartridge main body 31 due to the force of friction produced between the plate portions 36, 37 and the cartridge main body 31.

On the other hand, since the length of the extension 35a along the aforementioned lateral side of the cartridge main body 31 is longer than the length of the plate portions 36, 37 along the lateral side of the cartridge main body 31, the plate portions 36, 37 may be easily processed into a flat shape, even if the shutter member 34 is produced by punching from a plate-shaped blank material.

In a third embodiment of the disc cartridge of the present invention, explained hereinbelow, a read-only disc 1 is accommodated in the cartridge main body 3, and a shutter member is formed of a synthetic resin material. In the present embodiment, parts or components similar to those of the embodiment shown in FIGS. 1 to 4 are denoted by the same reference numerals, and the description common to that of the embodiment shown in FIGS. 1 to 4 is omitted for clarity.

Referring to FIGS. 11 to 14, the disc cartridge is provided with a read-only disc 1 and a cartridge main body 3 accommodating the read-only disc 1.

A shutter member 26 formed of a synthetic resin material is mounted on the cartridge main body 3, as shown in FIGS. 11 to 14. The function of the shutter member 26 is to open and close the aperture 22 for the optical pickup device. The shutter member 26 is provided with a slide portion 27 and a plate portion 28 upstanding from the slide portion 27, and is formed integrally from a synthetic material, such as polyacetal.

The plate portion 28 is in the form of a rectangle slightly larger in size than the aperture 22, that is, it has a longitudinal length of the order of 25 to 30 mm, capable of closing the aperture 22. The slide portion 27 is in the form of an elongated bar of a size to be intruded into the shutter opening groove 17 of the cartridge main body 3, and has a length longer than the width of the plate portion 28. The one end of the plate portion 28 is supported by one major surface of the slide portion 27.

The upper and lower major surfaces of the slide portion 27 are integrally formed with engaging lugs 29, 29 adapted for being engaged in the shutter opening groove 17. The slide portion 27 is formed with a retention notch 30 at a position corresponding to the notch 14 of the first embodiment.

The shutter member 26 is supported by the cartridge main body, with the proximal end of the plate portion 28 sliding against the one lateral side of the cartridge main body 3, by having the slide portion 27 introduced into the shutter opening groove 17 and by having the engaging projections 29, 29 engaged in the shutter opening groove 17.

The shutter member 26 may be moved along a lateral side of the cartridge main body 3, by the engaging projections 29, 29 being slid along the shutter opening groove 17, so that the plate portion 28 is slid along the lower major surface of the cartridge main body 3. The shutter member 26 may be moved relative to the cartridge main body 3, with the plate portion 28 capable of sliding along the lower major surface of the cartridge main body 3, as shown by an arrow B in FIGS. 13. When the shutter member 26 is moved relative to the cartridge main body 3, the plate portion 28 is moved between the position of closing the aperture 22 for the optical pickup device and the position of opening the aperture 22 for the optical pickup device.

Figure 13:
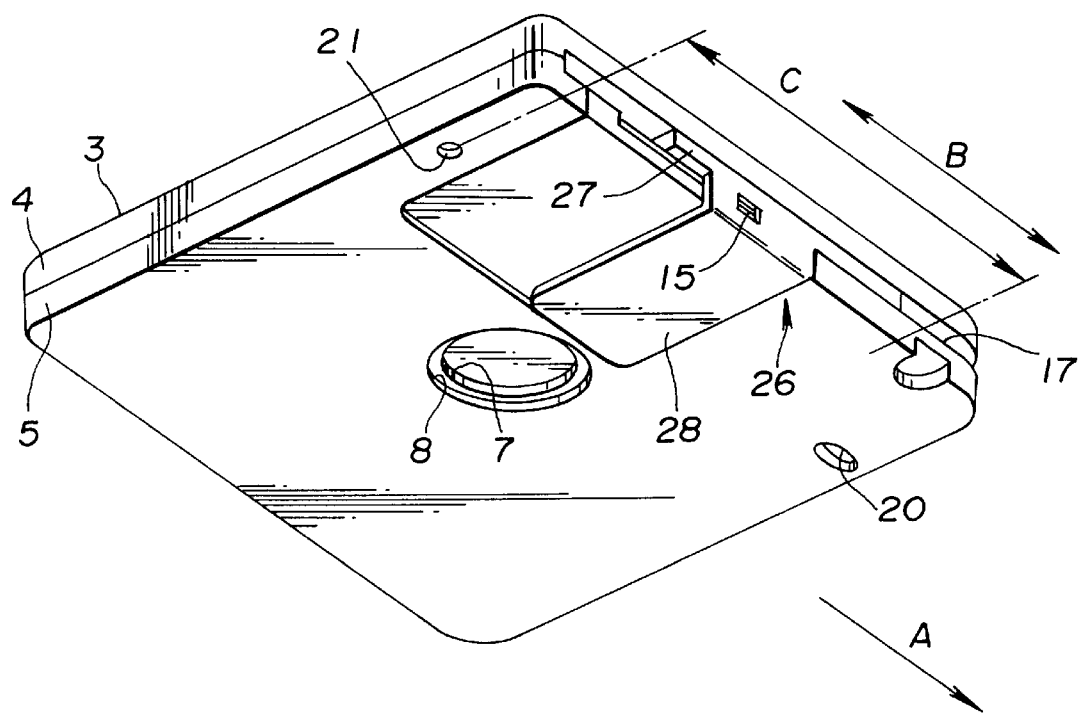
FIG. 13 is a perspective view showing the disc cartridge of FIG. 11 from the bottom side.
Figure 14:
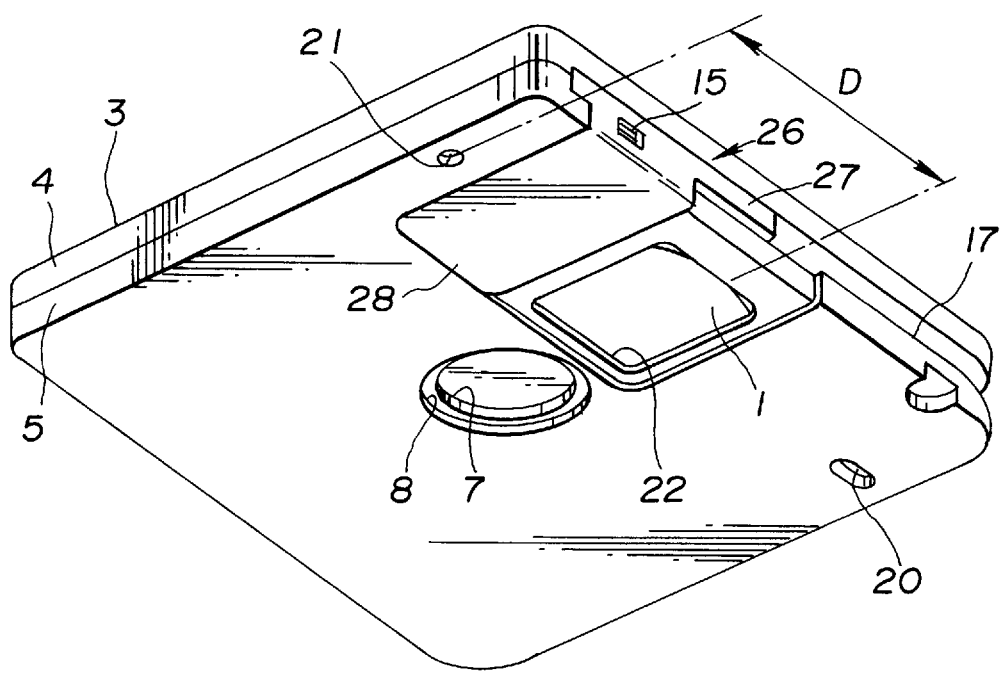
FIG. 14 is a perspective view showing the disc cartridge shown in FIG. 11 from the bottom side, with the shutter member in a position of opening the aperture in the cartridge main body.

Similarly to the preceding embodiments, a locking member 18 is provided in the cartridge main body 3 for locking the shutter member 26 in the position of closing the aperture 22 for the optical pickup device by the plate portion 28 as shown in FIG. 13.

The locking member 18 has its retainer 19 engaged in a notch 30 of the shutter member 26 when the plate portion 28 of the shutter member 26 is in the position of closing the aperture for the optical pickup device 22. That is, the locking member 18 is thrust via the shutter opening groove 17 by a thrust pin, not shown, of the disc reproducing apparatus, so that it is resiliently deformed towards the inner side of the cartridge main body 3, as shown by an arrow E in FIG. 11, for releasing retention of the shutter member 26 by the locking member 18.

A shutter closing through-hole 15 is formed in a proximal region of the plate portion 28 in the vicinity of the slide portion 27. During the closing operation of the shutter member 26 by the disc reproducing apparatus, an engaging pin, not shown, is engaged in the through-hole 15 for shifting the shutter member 26 towards the closing direction relative to the cartridge main body 3. A shutter closing pin escape groove 16 is formed in the sidewall of the cartridge main body 3 provided with the shutter opening groove 17 or extending along the shutter opening groove 17.

With the above described disc cartridge, when the disc cartridge is not in use, the shutter member 26 closes the aperture 22 for the optical pickup device by its plate portion 28. This prevents intrusion of dust and dirt or finger via the aperture 22 into the inside of the cartridge main body 3.

When in use, the disc cartridge is loaded on the chassis of the disc recording and/or reproducing apparatus. The cartridge main body 3 is loaded in position on the chassis by having plural positioning pins on the chassis intruded into the first and second positioning holes 21, 20. Also, the thrust pin, not shown, of the disc reproducing apparatus is intruded into the shutter opening groove 17 for resiliently deforming the locking member 18 into the inside of the cartridge main body 3 for releasing retention of the shutter member 26. Also, the one end of the slide portion 27 is thrust by the thrust pin for sliding the shutter member 26 from the closing position shown in FIG. 13 to the opening position shown in FIG. 14 for opening the aperture 22 for the optical pickup device. This enables the information signals to be read from the read-only disc 1 via the aperture 22 for the optical pickup device.

Meanwhile, with the present disc cartridge, when the aperture for the optical pickup device 22 is closed by the plate portion 28 of the shutter member 26, the distance between one end of the slide portion 27 and the first positioning hole 21 is a first distance X as indicated by an arrow C in FIG. 13. Also, with the present disc cartridge, when the aperture for the optical pickup device 22 is opened by the shutter member 26, the distance between the one end of the slide portion 27 and the first positioning hole 21 is a second distance Y as indicated by an arrow D in FIG. 14.

With the present disc cartridge, since the shutter member 26 is slid by the thrust pin intruded into the shutter opening groove 17, the shutter member 9, when modified into a shape suited to be bent from a one-piece metallic material, may be used in a disc reproducing apparatus adapted to be used in conjunction with a disc cartridge having the shutter member 9 formed of a synthetic resin material.

The read-only disc 1 is set and maintained in position on the disc table of the disc recording and/or reproducing apparatus.

Figure 12:
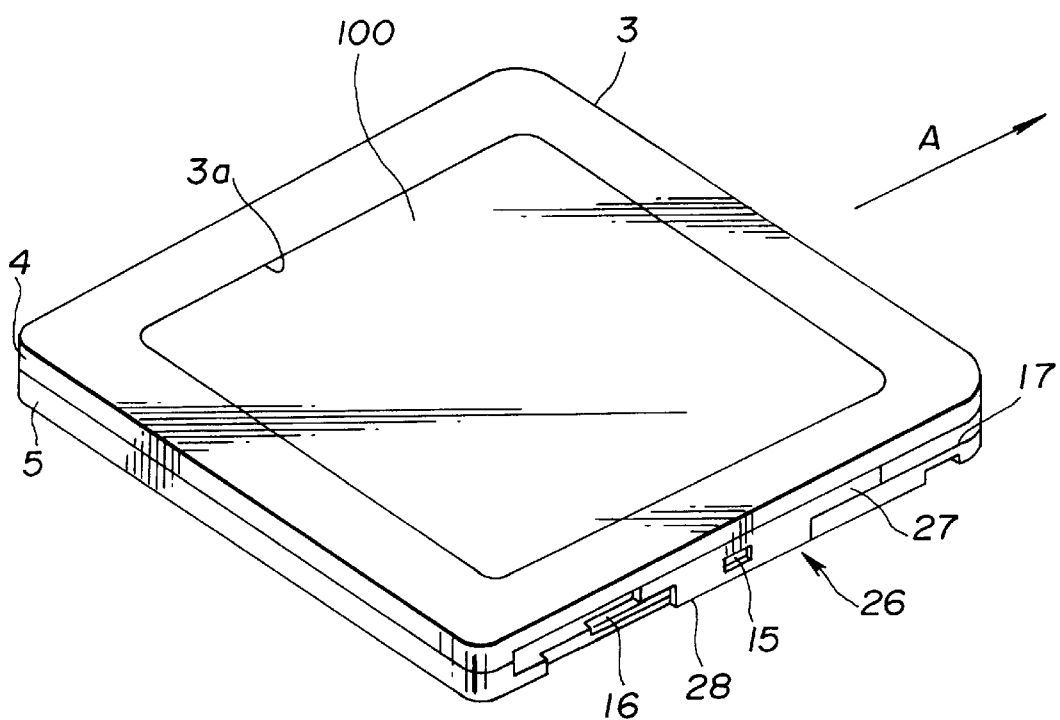
FIG. 12 is a perspective view showing the disc cartridge of FIG. 11 from the upper side.

Meanwhile, with the present disc cartridge, the shutter member 26 is not in contact with the upper major surface of the cartridge main body 3, as shown in FIG. 12. Thus the upper major surface of the cartridge main body 3 in its entirety may be utilized for inscription, printing or affixture of a label 100 for indicating the contents of the information signals recorded on the read-only disc 1.

On the other hand, since it suffices for the present disc cartridge to be provided with only one plate portion 28 of the shutter member 26 associated with the aperture for the optical pickup device 22, the disc cartridge may be reduced in size so that the cartridge main body 3 itself may be reduced in size.

A disc cartridge according to a fourth embodiment of the present invention, explained hereinbelow, accommodates a recordable disc 2 and is provided with a shutter member formed of a synthetic resin material. In the present embodiment, parts or components similar to those of the embodiment shown in FIGS. 6 to 9 are denoted by the same reference numerals, and the description common to that of the embodiment shown in FIGS. 6 to 9 is omitted for clarity.

Figure 15:
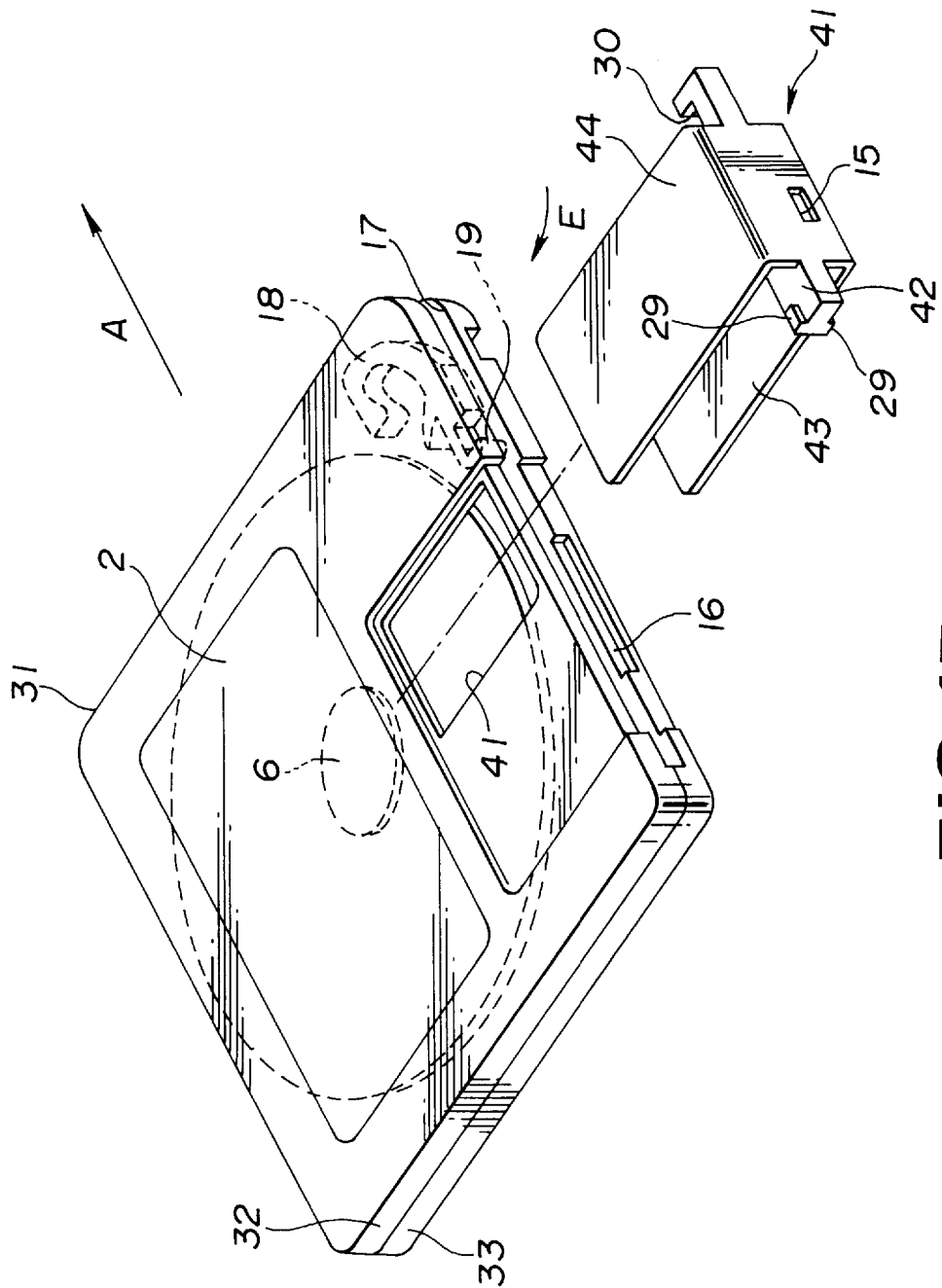
FIG. 15 is a perspective view showing a disc cartridge having accommodated therein a disc adapted for recording and/or reproducing information signals and fitted with a shutter member of a synthetic resin, with the shutter member detached from the cartridge main body.
Figure 18:
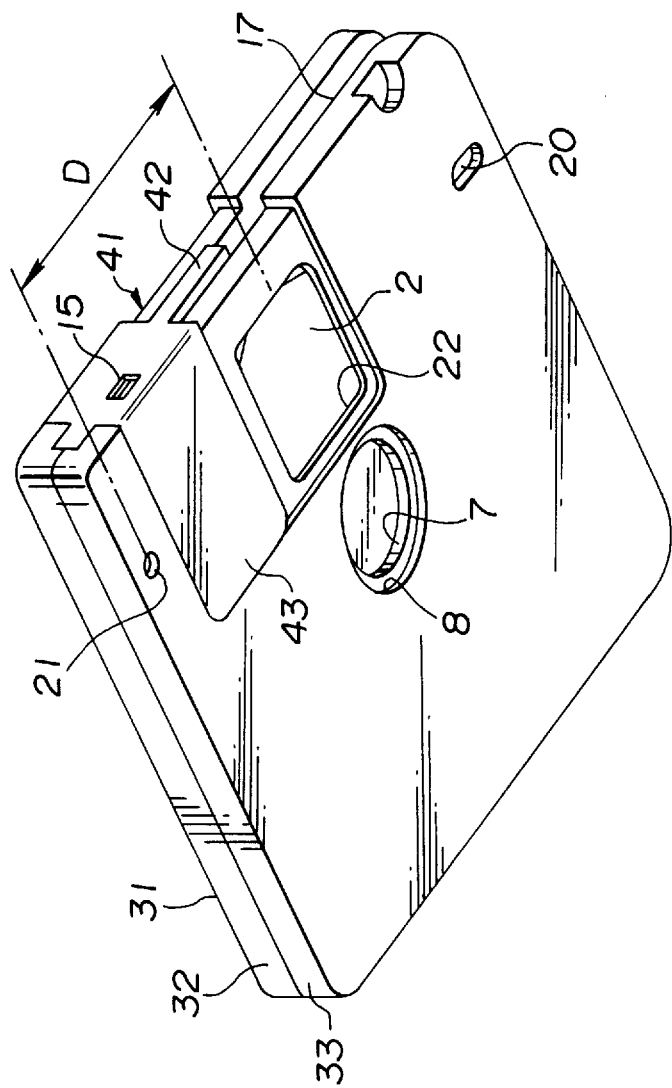
FIG. 18 is a perspective view showing the disc cartridge shown in FIG. 11 from the bottom side, with the shutter member in a position of opening the aperture in the cartridge main body.

Referring to FIGS. 15 and 18, the disc cartridge is comprised of a recordable disc 2 and a cartridge main body 31 accommodating the recordable disc 2.

A shutter member 50 of a synthetic resin material is provided on a cartridge main body 31 of the disc cartridge for opening or closing an aperture 22 for the optical pickup device. and an aperture 41 for the magnetic head unit. Referring to FIGS. 15 to 18, the shutter member 50 is provided with a first plate portion 43, associated with the aperture 22 for the optical pickup device, a second plate portion 44, associated with the aperture 41 for the magnetic head unit and a slide portion 42 adapted for supporting the proximal sides of the first and second plate portions 43, 44. The shuttle member 50 is integrally formed of a synthetic resin material, such as polyacetal.

The slide portion 42 is formed as an elongated rectangular bar of a size that can be inserted into a shutter opening groove 17 of the cartridge main body 31. For closing the apertures 22, 41 in case of necessity, the plate portions 43, 44 are formed as rectangular plates of a size slightly larger than these apertures and of a uniform thickness of an order of e.g. 0.3 mm. The plate portions 43, 44 face each other in parallel with a gap in-between substantially corresponding to the thickness of the cartridge main body 31.

The slide portion 42 is of a length longer than the width of the plate portions 43, 44. That is, both ends of the slide portion 42 are extended beyond the lateral sides of the plate portions 43, 44. The slide portion 42 is provided with a notch 30 as an engaged part, and retention lugs 29, 29 on both sides thereof, as in the shutter member 26 of the preceding embodiment.

Figure 16:
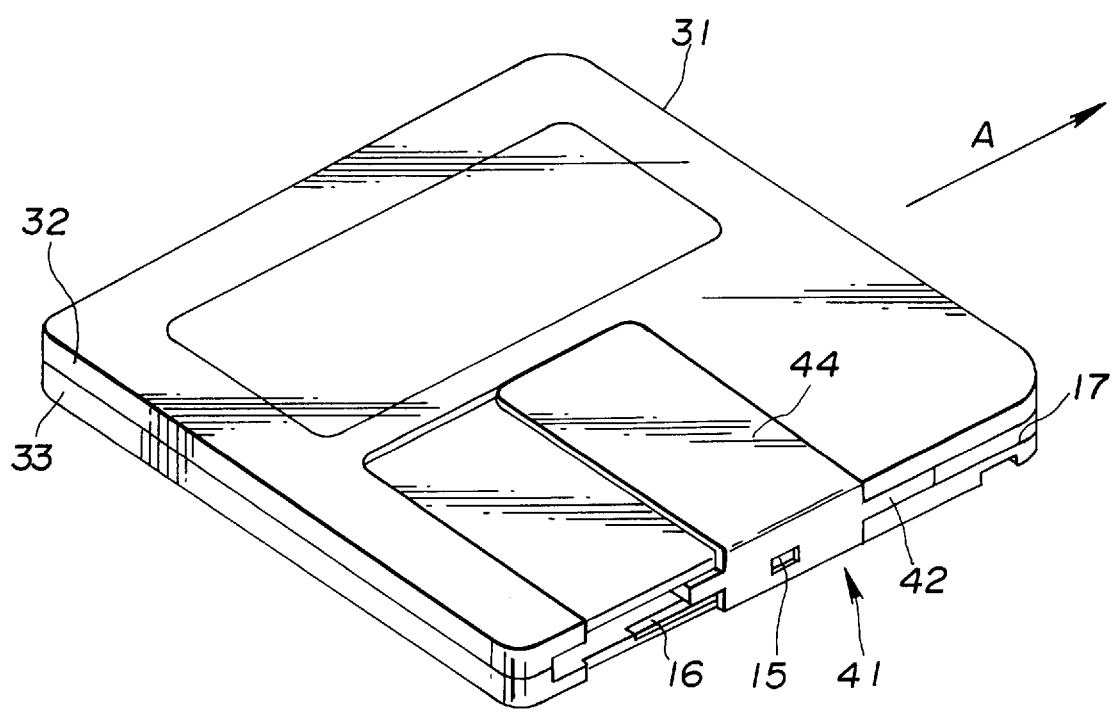
FIG. 16 is a perspective view showing the disc cartridge of FIG. 15 from the upper side.
Figure 17:
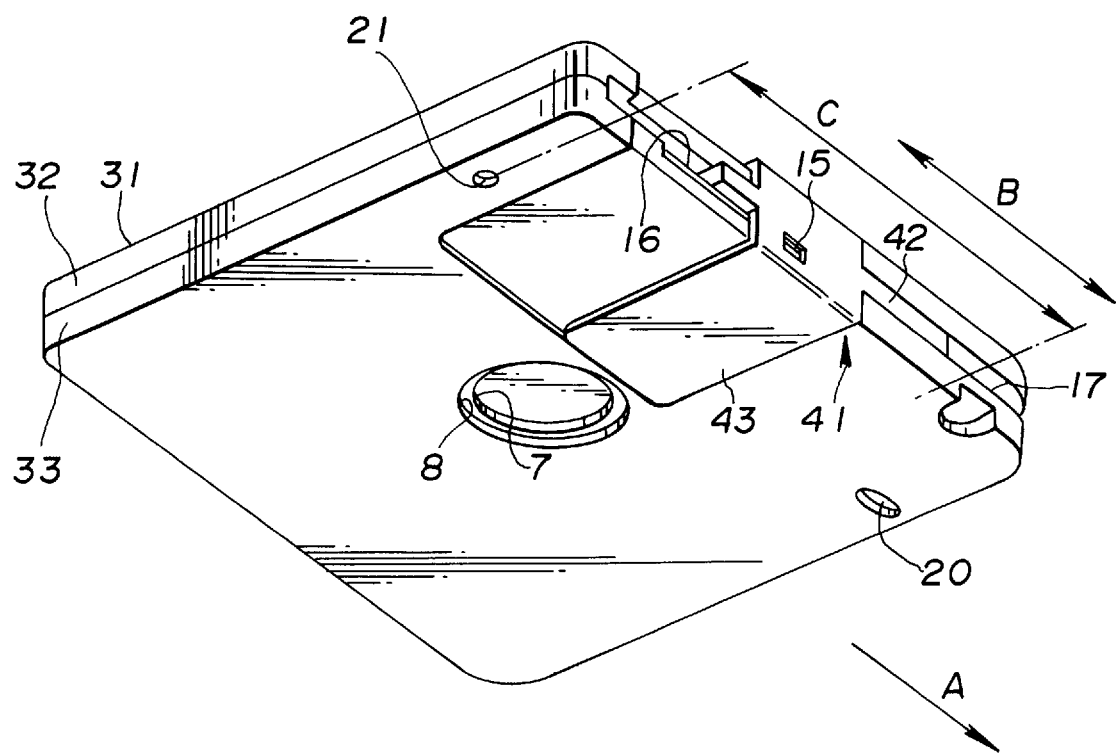
FIG. 17 is a perspective view showing the disc cartridge of FIG. 15 from the bottom side.

Referring to FIGS. 16 to 18, the shutter member 50 is supported by the cartridge main body 31, with the proximal sides of the plate portions 43, 44 substantially abutted against the lateral side of the cartridge main body 31, by having the slide portion 42 inserted into the shutter opening groove 17 and by having the engaging projections 29, 29 engaged in the shutter opening groove 17. Besides, the shutter member 50 is supported by the cartridge main body 31 with the first plate portion 43 extending along the lower major surface of the cartridge main body 31 and with the second plate portion 44 extending along the upper major surface of the cartridge main body 31.

With the engaging projections 29, 29 being slidable along the shutter opening groove 17, the shutter member 50 may be moved along the shutter opening groove 17 along the lateral side of the cartridge main body 31, as shown by an arrow B in FIG. 17. With the shutter member 41 being moved relative to the cartridge main body 31, the first plate portion 43 is moved between a position of closing the aperture 22 for the optical pickup device as shown in FIG. 17 and a position of opening the aperture 22 for the optical pickup device as shown in FIG. 18. Similarly to the first plate portion 43, with the shutter member 41 being moved relative to the cartridge main body 31, the second plate portion 44 is moved between a position of closing the aperture 41 for the magnetic head unit and a position of opening the aperture 41 for the magnetic head unit. The direction of movement of the shutter member 50 is parallel to the direction of insertion of the disc cartridge into the disc recording and/or reproducing apparatus shown by an arrow A in FIGS. 15 to 17.

Meanwhile, when the shutter member 50 is at the position of closing the apertures 22, 41, a retainer 19 of a locking member 18 provided in the cartridge main body 31 is engaged in the notch 30, under the resiliency of the locking member 18, for locking the shutter member 50 in the aperture closing position.

Meanwhile, a shutter closing through-hole 15 is provided in the proximal side of the first plate portion 43.

With the above described disc cartridge, when the disc cartridge is not in use, the shutter member 41 closes the aperture for the optical pickup device 22, and the aperture 22 for the magnetic head unit by its plate portions 43, 44. This prevents intrusion of dust and dirt or finger via the apertures 22, 41 into the inside of the cartridge main body 31.

When in use, the disc cartridge is loaded on the chassis of the disc recording and/or reproducing apparatus. The cartridge main body 31 is loaded in position on the chassis by having plural positioning pins of the cartridge loading section on the chassis intruded into the first and second positioning holes 21, 20. Also, the thrust pin, not shown, of the disc reproducing apparatus is intruded into the shutter opening groove 17 for resiliently deforming the locking member 18 into the inside of the cartridge main body 3 for releasing retention of the shutter member 50 by the locking member 18. Also, one end of the slide portion 42 is thrust by the thrust pin for sliding the shutter member 50 from the closing position shown in FIG. 17 to the opening position shown in FIG. 18 for opening the apertures 22, 41. The recordable disc 2 is set and maintained on the disc table of the disc recording and/or reproducing apparatus with a region of one of the major surfaces of the disc around the center hole 7 resting on the upper surface of the disc table. This enables the information signals to be read from the read-only disc 1 via the aperture 22 for the optical pickup device.

Meanwhile, with the present disc cartridge, when the apertures 22, 41 are closed by the plate portions 43, 44 of the shutter member 41, the distance between one end of the slide portion 42 and the first positioning hole 21 is a first distance X as indicated by an arrow C in FIG. 17, as in the disc cartridges of the preceding embodiments. Also, with the present disc cartridge, when the apertures 22, 41 are opened by the shutter member 50, the distance between the one end of the slide portion 42 and the first positioning hole 21 is a second distance Y as indicated by an arrow D in FIG. 18, as in the disc cartridges of the preceding embodiments.

With the present disc cartridge, since the shutter member 41 is slid by the thrust pin intruded into the shutter opening groove 17, the shutter member 9, when modified into a shape suited to be bent integrally from a one-piece metal sheet, may be used in a disc reproducing apparatus adapted to be used in conjunction with a disc cartridge having the shutter member 9 formed of a synthetic resin material.

Meanwhile, the disc accommodated in the disc cartridge of the present embodiment may also be a magnetic disc instead of the magneto-optical disc.

With the above described disc cartridge, when the shutter member is formed by bending a metal plate material, and the shutter member is changed to a shape suited to integral molding from a synthetic resin material, the shutter member may still be used in a disc recording and/or reproducing apparatus adapted for being used with a disc cartridge associated with a shutter member made from the metallic plate material.

Also, with the above described disc cartridge, when the shutter member is formed by integrally molding a synthetic resin material, and the shutter member is changed to a shape suited to bending from a one-piece metal plate or sheet, the shutter member may still be used in a disc recording and/or reproducing apparatus adapted for being used with a disc cartridge associated with a shutter member made from the synthetic resin material.

What is claimed is:

1. A disc cartridge, comprising:
    a quadrilateral-shaped cartridge main body having a length between 68 millimeters and 72 millimeters, the main body accommodating a disc having a diameter of approximately 64 millimeters, the cartridge main body including:
        an aperture in at least one major surface thereof providing access to a portion of a major surface of the disc from outside; and
        a shutter opening groove in a lateral side thereof, the lateral side being perpendicular to the at least one major surface;
    a shutter member movably supported by the cartridge main body, the shutter member having a closed position in which the shutter member covers the aperture, and an open position, the shutter member comprising:
        a rectangular connecting portion including a first major side parallel to, and laterally displaced from, a second major side, the connecting portion being disposed adjacent the lateral side of the cartridge main body and parallel thereto, with the major sides parallel to the shutter opening groove;
        a plate portion extending from the first major side of the connecting portion in an extending direction in a plane perpendicular to the connecting portion, the plate portion covering the aperture when the shutter member is in its closed position;
        an inserting portion extending from the second major side of the connecting portion into the shutter opening groove and terminating in a remote side, the inserting portion extending in the extending direction in a plane parallel to, and laterally displaced from, the plane of the plate portion; and
        a notch portion in the inserting portion, the notch portion being defined by two surfaces which are substantially parallel to each other, the plate portion, the notch portion, the inserting portion, and the connecting portion being formed by bending one piece of a metallic material, and a shutter lock having a fixed end secured within the cartridge main body, and a free end, engagement whereof in the notch portion of the shutter member locking the shutter member in the closed position, wherein:

the shutter member has a direction of movement relative to the cartridge main body, and the inserting portion additionally includes a shutter opening lug extending from the inserting portion into the shutter opening groove, the shutter opening lug extending from the inserting portion in a plane perpendicular to the plane of the inserting portion and parallel to the direction of movement of the shutter member relative to the cartridge main body.

2. A disc cartridge according to claim 1, wherein the shutter opening lug and the notch portion are together formed by bending a portion of the inserting portion.

3. A disc cartridges, comprising:

a quadrilateral-shaped cartridge main body having a length between 68 millimeters and 72 millimeters, the main body accommodating a disc having a diameter of approximately 64 millimeters, the cartridge main body including:

an aperture in at least one major surface thereof providing access to a portion of a major surface of the disc from outside; and a shutter opening groove in a lateral side thereof, the lateral side being perpendicular to the at least one major surface, a shutter member movably supported by the cartridge main body, the shutter member having a closed position in which the shutter member covers the aperture, and an open position, the shutter member comprising:

an elongate, rectangular-prism-shaped slide portion, slidably mounted in the shutter opening groove and being substantially accommodated thereby, having a major axis aligned along the shutter opening groove, and including a first face facing into the shutter opening groove, a second face, opposite the first, face third and fourth faces interconnecting the first and second faces, and a notch portion formed in the first face;

a connecting portion extending in a plane from part of the third face of the slide portion and terminating in a remote side, the connecting portion including a face forming a lateral extension of part of the second face; and a plate portion extending from the remote side of the connecting portion in a plane perpendicular to the connecting portion and to the major axis of the slide portion, the plate portion covering the aperture when the shutter member is in the closed position;

the plate portion, the connecting portion, the notch portion and the slide portion being formed integrally from a synthetic resin material, and a shutter lock, the shutter lock including a fixed end secured within the cartridge main body, and a free end, engagement whereof in the notch portion of the shutter member locking the shutter member in the closed position, wherein:

the slide portion of the shutter member additionally comprises a lug extending perpendicularly from the third face and a second lug extending perpendicularly from the fourth face, and at least one of the lug and the second lug engages with the shutter opening groove.

4. A disc cartridge for accommodating a disc having a central portion and a recording area, the recording area having an inner periphery and an outer periphery, the cartridge having an insertion direction, and being adapted for operation by an external shutter operating member, the cartridge comprising:

a quadrilateral-shaped cartridge main body having a length between 68 millimeters and 72 millimeters, the main body accommodating the disc, the cartridge main body including:

a first aperture formed in at least one major surface thereof, providing access to a portion of the recording area of the disc from outside, the aperture extending from the inner periphery to the outer periphery of the recording area of the disc;

a second aperture formed in the at least one major surface to provide access to the central portion of the disc;

a shutter opening groove formed in a lateral side of the cartridge main body, parallel to the insertion direction, the lateral side being perpendicular to the at least one major surface, the shutter opening groove being formed to receive the external shutter opening member; and a longitudinal groove formed in the at least one major surface, adjacent to and parallel with the lateral side, a shutter member slidably mounted on the cartridge main body, the shutter member having a closed position in which the shutter member covers the aperture, and an open position, the shutter member comprising:

an elongate inserting portion slidably mounted in the shutter opening groove and being substantially accommodated thereby, having a major axis aligned along the shutter opening groove, and including a first face facing into the shutter opening groove, a second face, opposite the first face, third and fourth faces interconnecting the first and second faces, and a notch portion formed in the first face:

a connecting portion extending in a plane from part of the third face of the slide portion and terminating in a remote side; and a plate portion extending from the remote side of the connecting portion in a plane perpendicular to the connecting portion and to the major axis of the slide portion, the plate portion including:

a plane cover portion covering the aperture when the shutter member is in the closed position, and an engaging portion, extending from the plate cover portion perpendicularly thereto to engage with the longitudinal groove, the engaging portion, together with the inserting portion, slidably mounting the shutter member on the cartridge main body, and a shutter lock having a fixed end secured within the cartridge main body, and a free end, the free end including a projecting locking portion, engagement of the projecting locking portion in the notch portion of the shutter member locking the shutter member in the closed position, the free end having a locking position, wherein the protecting locking portion engages in the notch portion, and a released position, wherein the locking portion is released from the notch portion, the free end being shaped to be moved between the locking position and the released position by the external shutter opening member, wherein the plate portion, the inserting portion, the notch portion, the connecting portion, and the engaging portion are formed by bending one piece of a metallic material, and wherein the shutter member has a direction of movement relative to the cartridge main body, and the inserting portion additionally includes a shutter opening lug extending from the third face of the inserting portion into the shutter opening groove, the shutter opening lug extending perpendicularly from the third face of the inserting portion.

5. A disc cartridge for accommodating a disc having a central portion and a recording area, the recording area having an inner periphery and an outer periphery, the cartridge having an insertion direction, and being adapted for operation by an external shutter operating member, the cartridge comprising:

a quadrilateral-shaped cartridge main body having a length between 68 millimeters and 72 millimeters, the main body accommodating the disc, the cartridge main body including:

a first aperture formed in at least one major surface thereof, providing access to a portion of the recording area of the disc from outside, the aperture extending from the inner periphery to the outer periphery of the recording area of the disc;

a second aperture formed in the at least one major surface to provide access to the central portion of the disc;

a shutter opening groove formed in a lateral side of the cartridge main body, parallel to the insertion direction, the lateral side being perpendicular to the at least one major surface, the shutter opening groove being formed to receive the external shutter opening member; and a longitudinal groove formed in the at least one major surface, adjacent to and parallel with the lateral side, a shutter member slidably mounted on the cartridge main body, the shutter member having a closed position in which the shutter member covers the aperture, and an open position, the shutter member comprising:

an elongate inserting portion slidably mounted in the shutter opening groove and being substantially accommodated thereby, having a major axis aligned along the shutter opening groove, and including a first face facing into the shutter opening groove, a second face, opposite the first face, third and fourth faces interconnecting the first and second faces, and a notch portion formed in the first face;

a connecting portion extending in a plane from part of the third face of the slide portion and terminating in a remote side; and a plate portion extending from the remote side of the connecting portion in a plane perpendicular to the connecting portion and to the major axis of the slide portion, the plate portion including:

a plane cover portion covering the aperture when the shutter member is in the closed position, and an engaging portion, extending from the plate cover portion perpendicularly thereto to engage with the longitudinal groove, the engaging portion, together with the inserting portion, slidably mounting the shutter member on the cartridge main body, and a shutter lock having a fixed end secured within the cartridge main body, and a free end, the free end including a Projecting locking portion, engagement of the projecting locking portion in the notch portion of the shutter member locking the shutter member in the closed position, the free end having a locking position, wherein the projecting locking portion engages in the notch portion, and a released position, wherein the locking portion is released from the notch portion, the free end being shaped to be moved between the locking position and the released position by the external shutter opening member, wherein the plate portion, the inserting portion, the notch portion, and the connecting portion are formed integrally from a synthetic resin material, and wherein:

the inserting portion of the shutter member additionally comprises a lug extending perpendicularly from the third face and a lug extending perpendicularly from the fourth face, and at least one of the lugs engages with the shutter opening groove.

6. A disc cartridges, comprising:

a disc having a diameter of approximately 64 millimeters;

a quadrilateral-shaped main body having a length between 68 millimeters and 72 millimeters, the main body accommodating the disc, the main body an upper major surface, a lower major surface, a peripheral side, a shutter opening groove in the peripheral side, and an aperture in the lower major surface for exposing a portion of the disc to the outside;

a shutter which is slidable in a sliding direction along the peripheral side between an open and a closed position, the shutter comprising:

a plate portion for closing the aperture when the shutter is in the closed position; and an inserting portion which is substantially flat and in a plane parallel to the plate portion, the inserting portion extending along a surface of the shutter opening groove; and an engaging means, wherein the inserting portion has a notch, defined by two surfaces which are substantially parallel to each other, for engaging with the engaging means to lock the shutter in the closed position, and wherein the shutter further comprises a lug formed by segmenting a portion of the inserting portion away from the inserting portion to form the notch and the lug.

* * * * *

UNITED STATES PATENT AND TRADEMARK OFFICE
CERTIFICATE OF CORRECTION

PATENT NO.: 5,822,297
DATED: October 13, 1998
INVENTOR(S): HIROTOSHI FUJISAWA

It is certified that an error appears in the above-identified patent and that said Letters Patent is hereby corrected as shown below:

Column 17, line 44, "face" should be --face,--.

Column 20, line 9, "Projecting" should be --projecting--.

Signed and Sealed this

Twenty-third Day of March, 1999

Attest:

Q. TODD DICKINSON

Attesting Officer

Acting Commissioner of Patents and Trademarks